(12) United States Patent
Lee

(10) Patent No.: US 9,380,246 B2
(45) Date of Patent: Jun. 28, 2016

(54) DIGITAL CORRELATED DOUBLE SAMPLING CIRCUIT AND IMAGE SENSOR INCLUDING THE SAME

(71) Applicant: Samsung Electronics Co., Ltd., Suwon-si, Gyeonggi-do (KR)

(72) Inventor: Hyeok-Jong Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/335,304

(22) Filed: Jul. 18, 2014

(65) Prior Publication Data

US 2015/0138408 A1 May 21, 2015

(30) Foreign Application Priority Data

Nov. 21, 2013 (KR) .................. 10-2013-0141986

(51) Int. Cl.
*H04N 5/378* (2011.01)

(52) U.S. Cl.
CPC .................................... *H04N 5/378* (2013.01)

(58) Field of Classification Search
CPC . H04N 5/378; H04N 5/3745; H04N 5/37455; H04N 5/3355
See application file for complete search history.

(56) References Cited

U.S. PATENT DOCUMENTS

| 8,144,228 | B2 | 3/2012 | Gelfand |
| 8,421,891 | B2 | 4/2013 | Morikawa et al. |
| 8,462,139 | B2 | 6/2013 | Raynor |
| 2003/0177295 | A1* | 9/2003 | Hsu .......................... G06F 5/14 710/200 |
| 2006/0072168 | A1 | 4/2006 | Okano et al. |
| 2011/0317039 | A1 | 12/2011 | Ise |
| 2012/0229319 | A1 | 9/2012 | Takahashi et al. |
| 2013/0089175 | A1 | 4/2013 | Mo et al. |
| 2013/0278451 | A1* | 10/2013 | Kim ..................... H03K 23/005 341/98 |

FOREIGN PATENT DOCUMENTS

KR 100850498 B1 7/2008
KR 1020130009065 A 1/2013

* cited by examiner

*Primary Examiner* — Christopher K Peterson
(74) *Attorney, Agent, or Firm* — Myers Bigel & Sibley, P.A.

(57) ABSTRACT

A digital correlated double sampling (CDS) circuit includes a first latch unit, a second latch unit and a calculating unit. The first latch unit stores digital reset component data and digital image component data by latching a count signal in response to a first control signal. The second latch unit stores the digital reset component data by latching an output of the first latch unit in response to a second control signal. The calculating unit generates digital effective image data by subtracting the digital reset component data from the digital image component data.

20 Claims, 13 Drawing Sheets

DIGITAL CORRELATED DOUBLE SAMPLING CIRCUIT AND IMAGE SENSOR INCLUDING THE SAME

CROSS-REFERENCE TO RELATED APPLICATION

This application claims priority under 35 USC §119 to Korean Patent Application No. 10-2013-0141986, filed on Nov. 21, 2013 in the Korean Intellectual Property Office (KIPO), the contents of which are herein incorporated by reference in their entirety.

BACKGROUND

1. Technical Field

Example embodiments relate generally to correlated double sampling (CDS) technologies, and more particularly to digital CDS circuits and image sensors including digital CDS circuits.

2. Description of the Related Art

Charge coupled device (CCD) image sensors and complementary metal oxide semiconductor (CMOS) image sensors have been used as devices for capturing images. Typically, analog pixel signals output from a pixel array of the CMOS image sensor may have variations due to differences between intrinsic characteristics of pixels, such as fixed pattern noise (FPN), and digital pixel signals generated based on the analog pixel signals may have variations due to differences between characteristics of analog-to-digital (ADC) converters that are located corresponding to columns of the pixel array of the CMOS image sensor. To compensate such variations, correlated double sampling (CDS) technologies may be used to operate the CMOS image sensors.

SUMMARY

According to example embodiments, a digital correlated double sampling (CDS) circuit includes a first latch unit, a second latch unit and a calculating unit. The first latch unit stores digital reset component data and digital image component data by latching a count signal in response to a first control signal. The second latch unit stores the digital reset component data by latching an output of the first latch unit in response to a second control signal. The calculating unit generates digital effective image data by subtracting the digital reset component data from the digital image component data bit by bit and sequentially outputs the digital effective image data bit by bit.

The digital image component data may be a first Gray code, and the digital reset component data may be a second Gray code. The calculating unit may sequentially generate bits of a first binary code corresponding to the first Gray code, may sequentially generate bits of a second binary code corresponding to a negative representation of the second Gray code, and may generate the digital effective image data by sequentially adding the bits of the first binary code and the bits of the second binary code.

The calculating unit may generate a first binary bit of the first binary code based on all bits of the first Gray code, may generate a second binary bit of the second binary code based on all bits of the second Gray code and may generate a first bit of the digital effective image data based on the first binary bit and the second binary bit.

In an example embodiment, the first latch unit may sequentially output the first Gray code bit by bit in response to a third control signal, and the second latch unit may sequentially output the second Gray code bit by bit in response to the third control signal. The calculating unit may generate the first binary bit by sequentially performing XOR operations based on each of the bits of the first Gray code and may generate the second binary bit by sequentially performing the XOR operations based on each of the bits of the second Gray code.

In an example embodiment, the first latch unit may simultaneously output the all bits of the first Gray code, and the second latch unit may simultaneously output the all bits of the second Gray code. The calculating unit may generate the first binary bit by performing a XOR operation on the all bits of the first Gray code and may generate the second binary bit by performing the XOR operation on the all bits of the second Gray code.

The first binary bit may be a least significant bit (LSB) of the first binary code, the second binary bit may be a LSB of the second binary code, and the first bit of the digital effective image data may be a LSB of the digital effective image data.

The calculating unit may generate a third binary bit of the first binary code based on the first binary bit and a first Gray bit of the first Gray code, may generate a fourth binary bit of the second binary code based on the second binary bit and a second Gray bit of the second Gray code and may generate a second bit of the digital effective image data based on the third binary bit and the fourth binary bit.

In an example embodiment, the first latch unit may include a plurality of image latches and a plurality of image output switches. Each image latch may store a respective one bit of the digital reset component data by latching a respective one bit of the count signal in response to the first control signal and may store a respective one bit of the digital image component data by latching the respective one bit of the count signal in response to the first control signal. Each image output switch may selectively connect an output terminal of a respective one image latch with a first signal line in response to a third control signal.

The second latch unit may include a plurality of reset latches and a plurality of reset output switches. Each reset latch may be connected to the output terminal of the respective one image latch and may store the respective one bit of the digital reset component data by latching an output of the respective one image latch in response to the second control signal. Each reset output switch may selectively connect an output terminal of a respective one reset latch with a second signal line in response to the third control signal.

In an example embodiment, the digital image component data may be a first Gray code, and the digital reset component data may be a second Gray code. The calculating unit may include a first Gray-to-binary converter, a second Gray-to-binary converter and a 1-bit full adder. The first Gray-to-binary converter may generate a first binary code by performing a Gray-to-binary conversion on the digital image component data bit by bit. The second Gray-to-binary converter may generate a second binary code by performing the Gray-to-binary conversion and a complement conversion on the digital reset component data bit by bit. The 1-bit full adder may generate the digital effective image data by adding the first binary code and the second binary code bit by bit.

In an example embodiment, the first Gray-to-binary converter may include a first XOR gate and a first flip-flop. The first flip-flop may store an output of the first XOR gate. The first XOR gate may generate one bit of the first binary code by performing a XOR operation on one bit of the digital image component data and an output of the first flip-flop.

The second Gray-to-binary converter may include a second XOR gate and a second flip-flop. The second flip-flop may store an output of the second XOR gate. The second XOR gate may generate one bit of the second binary code by performing the XOR operation on one bit of the digital reset component data and an output of the second flip-flop, and a first initial value stored in the first flip-flop may be different from a second initial value stored in the second flip-flop.

In an example embodiment, the first Gray-to-binary converter may include a first XOR gate, a first binary bit generator, a first multiplexer and a first flip-flop. The first binary bit generator may generate a first binary bit of the first binary code by performing a XOR operation on all bits of the digital image component data. The first multiplexer may select one of an output of the first XOR gate and an output of the first binary bit generator in response to a selection signal. The first flip-flop may store an output of the first multiplexer. The first XOR gate may generate one bit of the first binary code except the first binary bit by performing the XOR operation on one bit of the digital image component data and an output of the first flip-flop.

The second Gray-to-binary converter may include a second XOR gate, a second binary bit generator, a second multiplexer and a second flip-flop. The second binary bit generator may generate a second binary bit of the second binary code by performing the XOR operation on all bits of the digital reset component data and by inverting a result of the XOR operation on the all bits of the digital reset component data. The second multiplexer may select one of an output of the second XOR gate and an output of the second binary bit generator in response to the selection signal. The second flip-flop may store an output of the second multiplexer. The second XOR gate generates one bit of the second binary code except the second binary bit by performing the XOR operation on one bit of the digital reset component data and an output of the second flip-flop.

According to example embodiments, an image sensor includes a pixel array, a comparison block, a global counter and a digital correlated double sampling (CDS) block. The pixel array generates a plurality of analog pixel signals in response to incident light. The comparison block generates a plurality of first control signals and a plurality of second control signals by comparing the plurality of analog pixel signals with a ramp signal. The global counter generates a count signal in response to a clock signal. The digital correlated double sampling (CDS) block generates a plurality of digital effective image data corresponding to the plurality of analog pixel signals by performing a digital CDS in response to the plurality of first and second control signals and the count signal. The comparison block includes a plurality of comparators, each comparator receives a respective one of the plurality of analog pixel signals, the digital CDS block includes a plurality of digital CDS circuits, and each digital CDS circuit is connected to a respective one of the plurality of comparators. Each digital CDS circuit includes a first latch unit, a second latch unit and a calculating unit. The first latch unit stores digital reset component data and digital image component data by latching the count signal in response to a respective one of the plurality of first control signals. The second latch unit stores the digital reset component data by latching an output of the first latch unit in response to a respective one of the plurality of second control signals. The calculating unit generates a respective one of the plurality of digital effective image data by subtracting the digital reset component data from the digital image component data bit by bit and sequentially outputs the respective one of the plurality of digital effective image data bit by bit.

Accordingly, the digital CDS circuit according to example embodiments may include two latch units each of which stores one of the digital reset component data and the digital image component data, and the calculating unit generating the digital effective image data may have a relatively simple structure. For example, the calculating unit may include a single 1-bit full adder, and thus the digital CDS circuit may have a relatively simple structure and a relatively small size.

A digital CDS according to further embodiments includes a first latch unit configured to receive a first count signal and to generate image data by latching the first count signal, a second latch unit configured to receive a second count signal and to generate reset data by latching the second count signal, and a calculating unit configured to generate corrected image data by subtracting the reset data from the image data. The calculating unit includes a one bit full adder that is configured to receive the image data and the reset data as serial data and to subtract the reset data from the image data one bit at a time.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
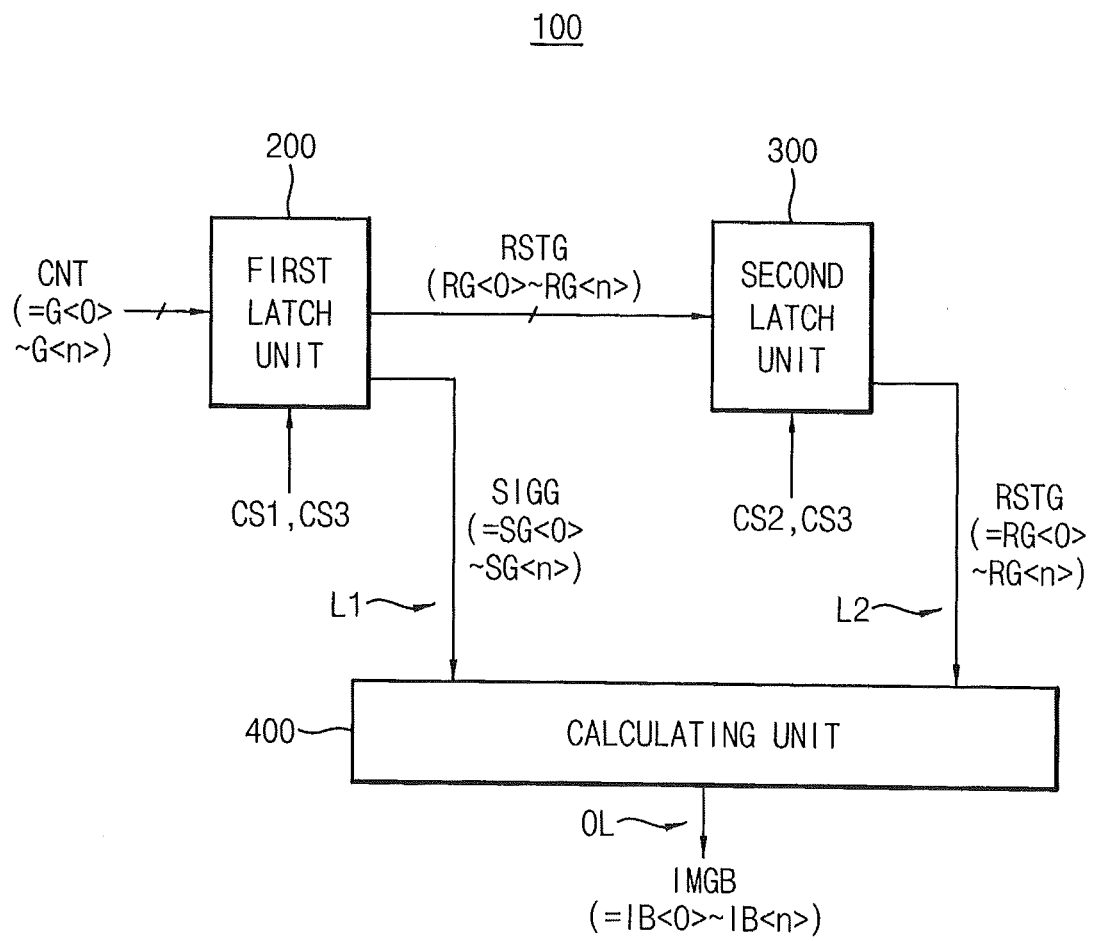
FIG. 1 is a block diagram illustrating a digital correlated double sampling (CDS) circuit according to example embodiments.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a digital correlated double sampling (CDS) circuit according to example embodiments.

A digital CDS circuit 100 illustrated in FIG. 1 may be applied to an image sensor that performs a CDS operation on an analog pixel signal output from a pixel array. Hereinafter, the digital CDS circuit according to example embodiments will be described based on a complementary metal-oxide semiconductor (CMOS) image sensor. However, the digital CDS circuit according to example embodiments may be applied to any image sensor, such as a charge-coupled device (CCD) image sensor. Detailed configurations of a CMOS image sensor and a unit pixel will be described below with reference to FIGS. 9 and 10.

Referring to FIG. 1, the digital CDS circuit 100 includes a first latch unit 200, a second latch unit 300 and a calculating unit 400.

The first latch unit 200 stores digital reset component data, or reset data, RSTG and digital image component data, or image data, SIGG by latching a count signal CNT in response to a first control signal CS1. The second latch unit 300 stores the digital reset component data RSTG by latching an output of the first latch unit 200 in response to a second control signal CS2.

The count signal CNT may be a (n+1)-bit Gray code that is generated from a Gray code counter (not illustrated), where n is a natural number. For example, the count signal CNT may include a first bit G<0> through a (n+1)-th bit G<n> and may have a sequentially increasing value. The digital image component data SIGG may be encoded using a first Gray code that is one of the values of the count signal CNT, and that corresponds to an image component of the analog pixel signal, and the digital reset component data RSTG may be encoded using a second Gray code that is another one of the values of the count signal CNT and that corresponds to a reset component of the analog pixel signal. Both the digital image component data SIGG and the digital reset component data RSTG may be encoded using (n+1)-bit Gray codes. For example, the digital image component data SIGG may include a first bit SG<0> through a (n+1)-th bit SG<n>, and the digital reset component data RSTG may include a first bit RG<0> through a (n+1)-th bit RG<n>. As will be appreciated, a Gray code is a binary numeral system in which two successive values differ in only one bit. Since multiple bits do not change from one value to the next, race conditions that can arise when one bit in an encoded number changes faster than another bit in the number can be avoided or mitigated.

The first latch unit 200 may substantially simultaneously or concurrently receive all bits G<0>~G<n> of the count signal CNT from the Gray code counter through a plurality of signal lines (e.g., (n+1) signal lines). The second latch unit 300 may substantially simultaneously receive all bits RG<0>~RG<n> of the digital reset component data RSTG from the first latch unit 200 through another plurality of signal lines (e.g., (n+1) signal lines).

In addition, the first latch unit 200 may provide all bits SG<0>~SG<n> of the digital image component data SIGG to the calculating unit 400 through one signal line (e.g., a first signal line L1) in response to a third control signal CS3. The second latch unit 300 may provide the all bits RG<0>~RG<n> of the digital reset component data RSTG to the calculating unit 400 through another one signal line (e.g., a second signal line L2) in response to the third control signal CS3. For example, the third control signal CS3 may include a plurality of switch control signals. Operations of the first and second latch units 200 and 300 in response to the plurality of switch control signals will be described below with reference to FIGS. 2, 4, 6 and 7.

The calculating unit 400 generates digital effective image data IMGB by subtracting the digital reset component data RSTG from the digital image component data SIGG. In some embodiments, the subtraction may be performed bit by bit, and the calculating unit may sequentially output the digital effective image data IMGB bit by bit through one signal line (e.g., an output signal line OL). However, this is only an example, and the digital effective image data may be generated and transmitted in other ways. For example, the digital effective image data IMGB may be a (n+1)-bit binary code and may include a first bit IB<0> through a (n+1)-th bit IB<n>. The calculating unit 400 may sequentially perform a Gray-to-binary conversion bit by bit.

The digital CDS circuit 100 according to example embodiments includes two latch units 200 and 300, each of which stores one of the digital image component data SIGG and the digital reset component data RSTG, and thus the calculating unit 400 generating the digital effective image data IMGB may have a relatively simple structure. For example, as will be described below with reference to FIG. 2, the calculating unit may include a single 1-bit full adder. Accordingly, the digital CDS circuit 100 may have a relatively simple structure and/or a relatively small size.

Figure 2:
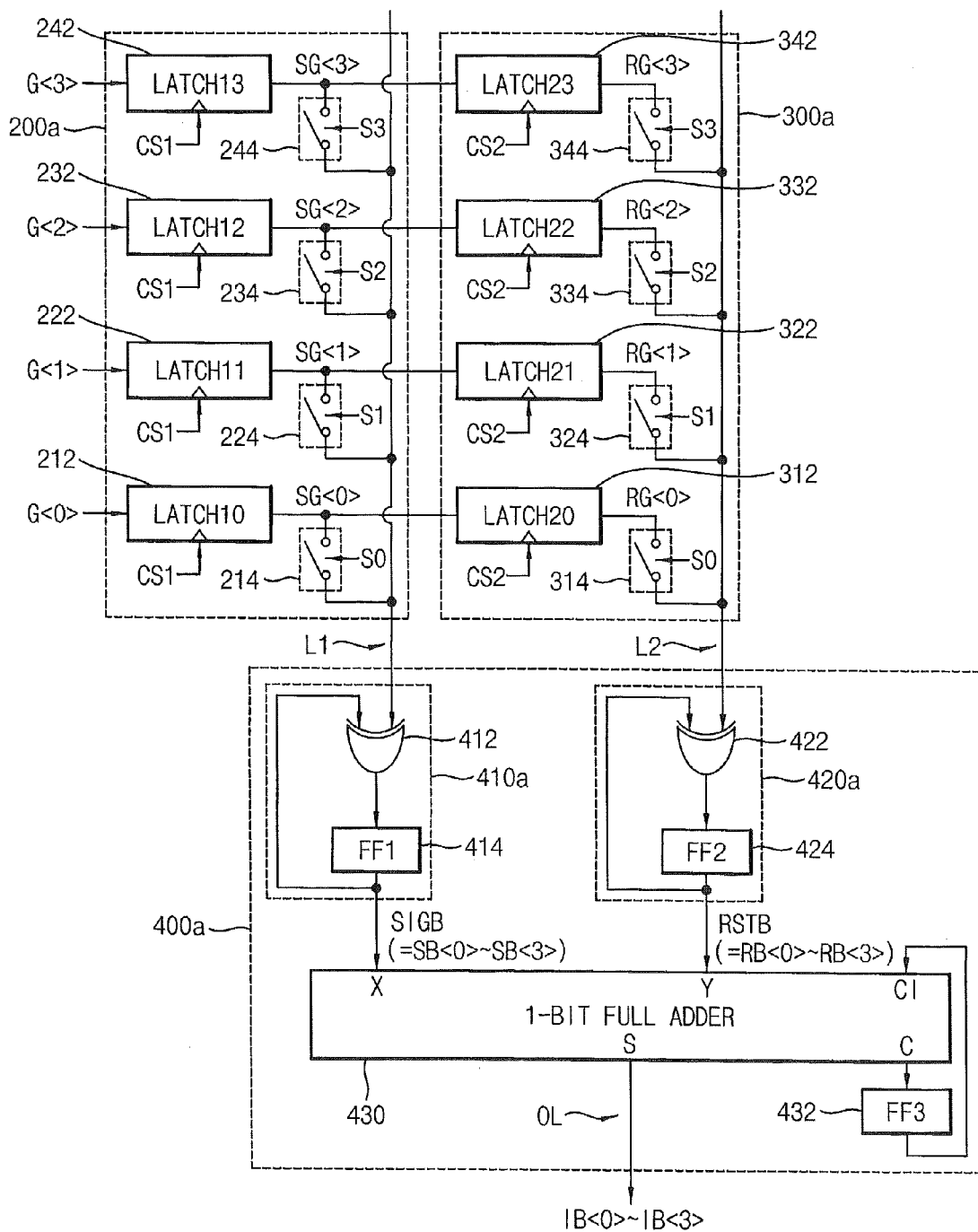
FIG. 2 is a diagram illustrating an example of the digital CDS circuit of FIG. 1.

FIG. 2 is a diagram illustrating an example of the digital CDS circuit of FIG. 1.

Referring to FIG. 2, a digital CDS circuit 100a includes a first latch unit 200a, a second latch unit 300a and a calculating unit 400a.

For convenience of description, configurations and operations of the digital CDS circuit 100a will be described based on 4-bit digital data. In other words, the digital CDS circuit 100a in FIG. 2 may generate 4-bit digital effective image data (e.g., a 4-bit binary code including bits IB<0>~IB<3>) based on 4-bit digital image component data (e.g., a 4-bit first Gray code including bits SG<0>~SG<3>) and 4-bit digital reset component data (e.g., a 4-bit second Gray code including bits RG<0>~RG<3>).

The first latch unit 200a may include a plurality of image latches 212, 222, 232 and 242 and a plurality of image output switches 214, 224, 234 and 244.

Each of the plurality of image latches 212, 222, 232 and 242 may store a respective one of bits RG<0>, RG<1>, RG<2> and RG<3> of the digital reset component data by latching a respective one of bits G<0>, G<1>, G<2> and G<3> of the count signal in response to the first control signal CS1, and then may store a respective one of bits SG<0>, SG<1>, SG<2> and SG<3> of the digital image component data by latching the respective one of the bits G<0>, G<1>, G<2> and G<3> of the count signal in response to the first control signal CS1. For example, the first image latch 212 may store the first bit RG<0> of the digital reset component data first by latching the first bit G<0> of the count signal in response to the first control signal CS1, and then may store the first bit SG<0> of the digital image component data later by latching the first bit G<0> of the count signal again in response to the first control signal CS1.

Each of the plurality of image output switches 214, 224, 234 and 244 may selectively connect an output terminal of a respective one of the plurality of image latches 212, 222, 232 and 242 with the first signal line L1 in response to the third control signal, e.g., in response to a respective one of a plurality of switch control signals S0, S1, S2 and S3. For example, the first image output switch 214 may selectively connect the output terminal of the first image latch 212 with the first signal line L1 in response to the first switch control signal S0.

The second latch unit 300a may include a plurality of reset latches 312, 322, 332 and 342 and a plurality of reset output switches 314, 324, 334 and 344.

Each of the plurality of reset latches 312, 322, 332 and 342 may be connected to the output terminal of the respective one of the plurality of image latches 212, 222, 232 and 242, and may store the respective one of the bits RG<0>, RG<1>, RG<2> and RG<3> of the digital reset component data by latching an output of the respective one of the plurality of image latches 212, 222, 232 and 242 in response to the second control signal CS2. For example, the first reset latch 312 may be connected to the output terminal of the first image latch 212, and may store the first bit RG<0> of the digital reset component data by latching the output of the first image latch 212 in response to the second control signal CS2.

Each of the plurality of reset output switches 314, 324, 334 and 344 may selectively connect an output terminal of a respective one of the plurality of reset latches 312, 322, 332 and 342 with the second signal line L2 in response to the third control signal, e.g., in response to the respective one of the plurality of switch control signals S0, S1, S2 and S3. For example, the first reset output switch 314 may selectively connect the output terminal of the first reset latch 312 with the second signal line L2 in response to the first switch control signal S0.

The calculating unit 400a may include a first Gray-to-binary converter 410a, a second Gray-to-binary converter 420a and a 1-bit full adder 430. The calculating unit 400a may further include a flip-flop 432.

The first Gray-to-binary converter 410a may generate a first binary code SIGB by performing a Gray-to-binary conversion on the digital image component data bit by bit. The first binary code SIGB may be a 4-bit binary code corresponding to the digital image component data and may include a first bit SB<0> through a fourth bit SB<3>.

The first Gray-to-binary converter 410a may include a first XOR gate 412 and a first flip-flop 414. The first XOR gate 412 may generate one of the bits SB<0>~SB<3> of the first binary code SIGB by performing the XOR operation on one of the bits SG<0>, SG<1>, SG<2> and SG<3> of the digital image component data and an output of the first flip-flop 414. The first flip-flop 414 may store a first initial value at an initial operation time of the digital CDS circuit 100a, and then may sequentially store an output of the first XOR gate 412. For example, the first initial value may be "0."

The second Gray-to-binary converter 420a may generate a second binary code RSTB by performing the Gray-to-binary conversion and a complement conversion on the digital reset component data bit by bit. The second binary code RSTB may be a 4-bit binary code corresponding to a negative representation of the digital image component data and may include a first bit RB<0> through a fourth bit RB<3>.

The second Gray-to-binary converter 420a may include a second XOR gate 422 and a second flip-flop 424. The second XOR gate 422 may generate one of the bits RB<0>~RB<3> of the second binary code RSTB by performing the XOR operation on one of the bits RG<0>, RG<1>, RG<2> and RG<3> of the digital reset component data and an output of the second flip-flop 424. The second flip-flop 424 may store a second initial value at the initial operation time of the digital CDS circuit 100a, and then may sequentially store an output of the second XOR gate 422. To perform the complement conversion, the second initial value may be different from the first initial value. For example, the second initial value may be "1."

The 1-bit full adder 430 may generate the digital effective image data by adding the first binary code SIGB and the second binary code RSTB bit by bit. For example, the 1-bit full adder 430 may include a first input terminal X receiving the bits SB<0>~SB<3> of the first binary code SIGB, a second input terminal Y receiving the bits RB<0>~RB<3> of the second binary code RSTB, a third input terminal CI receiving an output of the flip-flop 432, a first output terminal S outputting the bits IB<0>~IB<3> of the digital effective image data and a second output terminal C outputting a carry bit. The flip-flop 432 may store the carry output from the second output terminal C of the 1-bit full adder 430.

The calculating unit 400a may sequentially generate the bits SB<0>~SB<3> of the first binary code SIGB based on the bits SG<0>~SG<3> of the first Gray code, may sequentially generate the bits RB<0>~RB<3> of the second binary code RSTB based on the bits RG<0>~RG<3> of the first Gray code, and may generate the bits IB<0>~IB<3> of the digital effective image data by sequentially adding the bits SB<0>~SB<3> of the first binary code SIGB and the bits RB<0>~RB<3> of the second binary code RSTB.

For example, the calculating unit 400a may generate the first bit SB<0> of the first binary code SIGB based on the all bits SG<0>~SG<3> of the first Gray code, may generate the first bit RB<0> of the second binary code RSTB based on the all bits RG<0>~RG<3> of the second Gray code, and may generate the first bit IB<0> of the digital effective image data based on the first bit SB<0> of the first binary code SIGB and the first bit RB<0> of the second binary code RSTB. The first bit SB<0> of the first binary code SIGB may be a least significant bit (LSB) of the first binary code SIGB, the first bit RB<0> of the second binary code RSTB may be a LSB of the second binary code RSTB, and the first bit IB<0> of the digital effective image data may be a LSB of the digital effective image data.

In an example of FIG. 2, the first latch unit 200a may sequentially output the bits SG<0>~SG<3> of the first Gray code in response to the plurality of switch control signals S0, S1, S2 and S3 through the first signal line L1. The second latch unit 300a may sequentially output the bits RG<0>~RG<3> of the second Gray code in response to the plurality of switch control signals S0, S1, S2 and S3 through the second signal line L2. The calculating unit 400a may sequentially receive the bits SG<0>~SG<3> of the first Gray code through the first signal line L1 and may sequentially receive the bits RG<0>~RG<3> of the second Gray code through the second signal line L2. The calculating unit 400a may generate the first bit SB<0> of the first binary code SIGB by sequentially performing the XOR operations based on each of the bits SG<0>~SG<3> of the first Gray code and may generate the first bit RB<0> of the second binary code RSTB by sequentially performing the XOR operations based on each of the bits RG<0>~RG<3> of the second Gray code.

In addition, the calculating unit 400a may generate the second bit (e.g., SB<1> in FIG. 4) of the first binary code SIGB based on the first bit SB<0> of the first binary code SIGB and the first bit SG<0> of the first Gray code, may generate the second bit (e.g., RB<1> in FIG. 4) of the second binary code RSTB based on the first bit RB<0> of the second binary code RSTB and the first bit RG<0> of the second Gray code, and may generate the second bit (e.g., IB<1> in FIG. 4) of the digital effective image data based on the second bit (e.g., SB<1> in FIG. 4) of the first binary code SIGB and the second bit (e.g., RB<1> in FIG. 4) of the second binary code RSTB. The first bit SG<0> of the first Gray code may be a LSB of the first Gray code, and the first bit RG<0> of the second Gray code may be a LSB of the second Gray code. The second bit (e.g., SB<1> in FIG. 4) of the first binary code SIGB may be a second LSB of the first binary code SIGB, the second bit (e.g., RB<1> in FIG. 4) of the second binary code RSTB may be a second LSB of the second binary code RSTB, and the second bit (e.g., IB<1> in FIG. 4) of the digital effective image data may be a second LSB of the digital effective image data.

Figure 3:
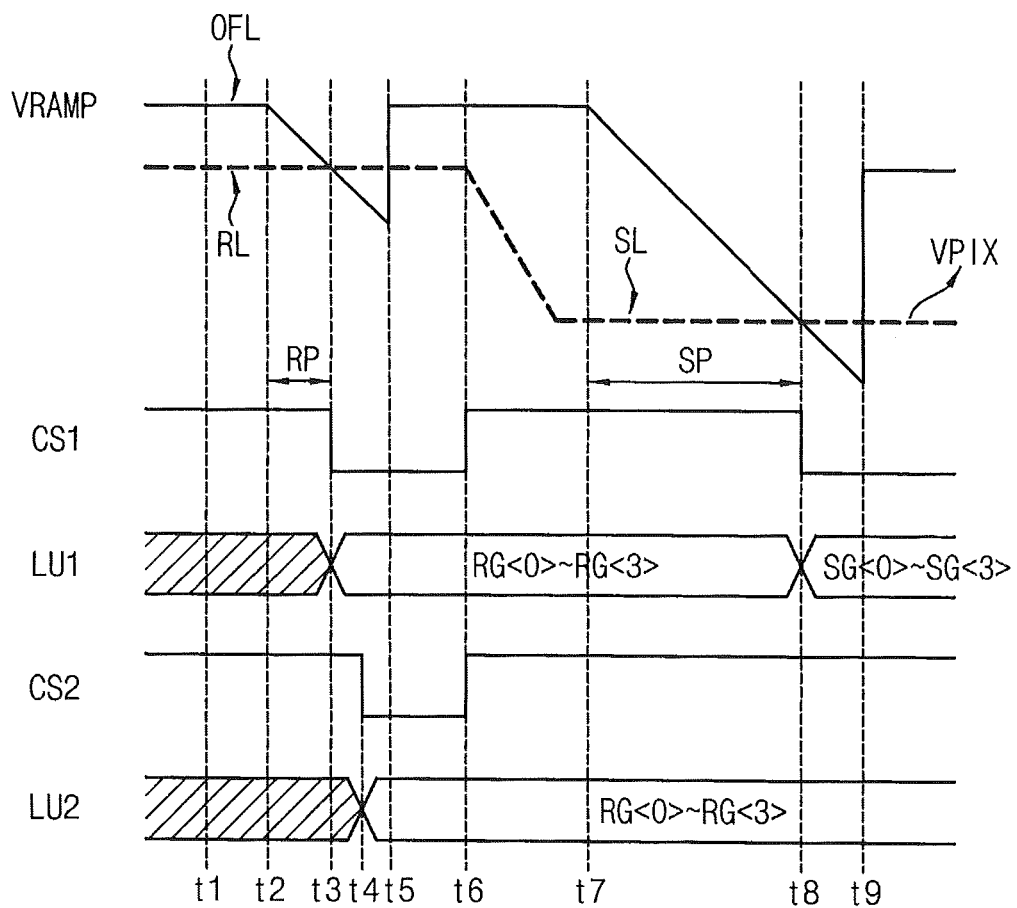
FIGS. 3 and 4 are timing diagrams for describing an operation of the digital CDS circuit of FIG. 2.
Figure 4:
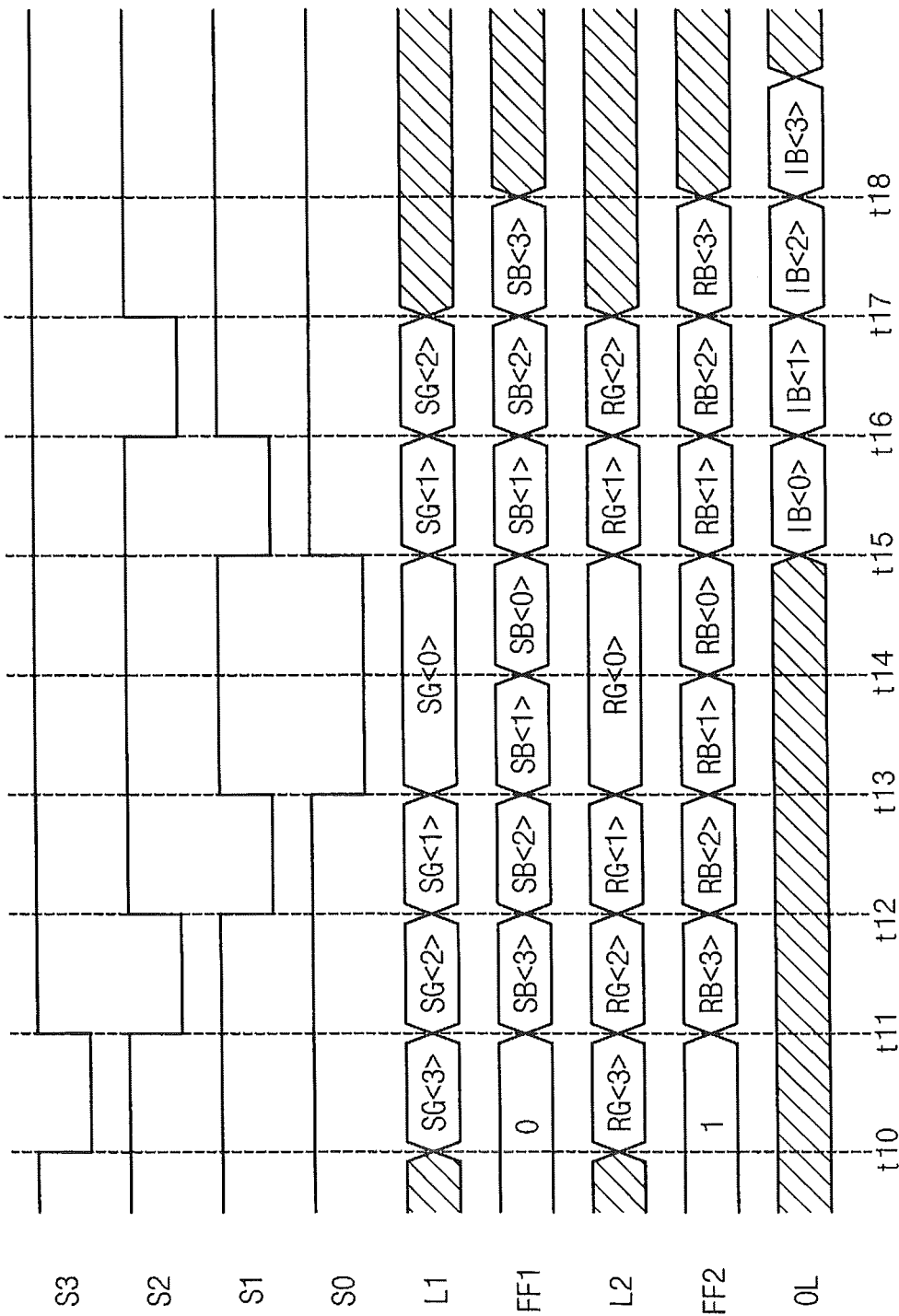

FIGS. 3 and 4 are timing diagrams for describing an operation of the digital CDS circuit of FIG. 2.

FIG. 3 illustrates that the bits SG<0>~SG<3> of the first Gray code are stored in the first latch unit 200a in FIG. 2 and the bits RG<0>~RG<3> of the second Gray code are stored in the second latch unit 300a in FIG. 2. In FIG. 3, LU1 represents types of codes stored in the first latch unit 200a in FIG. 2, and LU2 represents types of codes stored in the second latch unit 300a in FIG. 2. FIG. 4 illustrates that the calculating unit 400a in FIG. 2 generates the bits IB<0>~IB<3> of the digital effective image data based on the bits SG<0>~SG<3> of the first Gray code and the bits RG<0>~RG<3> of the second Gray code. In FIG. 4, FF1 represents types of bits stored in the first flip-flop 414 in FIG. 2, and FF2 represents types of bits stored in the second flip-flop 424 in FIG. 2.

Hereinafter, the operation of the digital CDS circuit 100a according to example embodiments will be described in detail with reference to FIGS. 2, 3 and 4.

As illustrated in FIG. 3, at time t1, an analog pixel signal VPIX has a reset level RL, and a ramp signal VRAMP has an offset level OFL that is higher than the reset level RL by a predetermined value. As will be described with reference to FIGS. 9 and 10, the ramp signal VRAMP may be generated from a voltage generator (e.g., an element 560 in FIG. 9) included in an image sensor, and the analog pixel signal VPIX may be generated from a pixel array (e.g., an element 510 in FIG. 9) included in the image sensor. The analog pixel signal VPIX may include a reset component and an image component. The reset level RL may correspond to a reset component of the analog pixel signal VPIX.

At time t2, the ramp signal VRAMP is activated and is decreased from the offset level OFL with a constant slope. The count signal applied to the first latch unit 200a may have (e.g., maintain) an initial value until time t2, and may be sequentially increased by a predetermined value (e.g., by "1") from time t2.

During a first comparison period from time t2 to time t5, a time point at which the first control signal CS1 is transitioned is determined by comparing the activated ramp signal VRAMP with the analog pixel signal VPIX. Since a level of the ramp signal VRAMP is higher than a level of the analog pixel signal VPIX during a period from time t2 to time t3 and is lower than the level of the analog pixel signal VPIX during a period from time t3 to time t5, the first control signal CS1 is transitioned from a logic high level to a logic low level at time t3.

In addition, at time t3, the first latch unit 200a latches a first value of the count signal in response to a first falling edge of the first control signal CS1, and the bits RG<0>~RG<3> of the second Gray code corresponding to the digital reset component data are stored in the plurality of image latches 212, 222, 232 and 242. A value of the digital reset component data may correspond to a length of a reset counting period RP. The first latch unit 200a outputs the bits RG<0>~RG<3> of the second Gray code.

At time t4, the second control signal CS2 is transitioned from the logic high level to the logic low level. The second latch unit 300a latches the output of the first latch unit 200a in response to a falling edge of the second control signal CS2, and the bits RG<0>~RG<3> of the second Gray code corresponding to the digital reset component data are stored in the plurality of reset latches 312, 322, 332 and 342.

At time t5, the ramp signal VRAMP is deactivated and has the offset level OFL again. At time t6, photo-charges collected by a photoelectric conversion unit (e.g., an element 610 in FIG. 10) included in the image sensor are transferred to a floating diffusion node (e.g., an element 630 in FIG. 10) included in the image sensor, and the level of the analog pixel signal VPIX is changed from the reset level RL to an image level SL. The image level SL may correspond to an image component of the analog pixel signal VPIX. In addition, at time t6, the first and second control signals CS1 and CS2 are transitioned from the logic low level to the logic high level.

At time t7, the ramp signal VRAMP is activated again and is decreased from the offset level OFL with the constant slope. The count signal may be initialized at any time point after time t3 (e.g., at which the ramp signal VRAMP is deactivated or at time t5), may have (e.g., maintain) the initial value until time t7, and may be sequentially increased by the predetermined value from time t7.

During a second comparison period from time t7 to time t9, another time point at which the first control signal CS1 is transitioned is determined by comparing the activated ramp signal VRAMP with the analog pixel signal VPIX. Since the level of the ramp signal VRAMP is higher than the level of the analog pixel signal VPIX during a period from time t7 to time t8 and is lower than the level of the analog pixel signal VPIX during a period from time t8 to time t9, the first control signal CS1 is transitioned from the logic high level to the logic low level at time t8.

In addition, at time t8, the first latch unit 200a latches a second value of the count signal in response to a second falling edge of the first control signal CS1, and the bits SG<0>~SG<3> of the first Gray code corresponding to the digital image component data are stored in the plurality of image latches 212, 222, 232 and 242. A value of the digital image component data may correspond to a length of an image counting period SP.

To generate the digital effective image data based on a single 1-bit full adder, the 1-bit full adder 430 included in the digital CDS circuit according to example embodiments may sequentially receive the first and second binary codes SIGB and RSTB in an order from LSBs to most significant bits (MSBs). The first Gray-to-binary converter 410a included in the digital CDS circuit 100a of FIG. 2 may sequentially generate the first binary code SIGB in an order from the first bit SB<0> (e.g., a LSB) to the fourth bit SB<3> (e.g., a MSB) based on Equations 1 through 7.

$$SB\langle 3\rangle = SG\langle 3\rangle \quad \text{[Equation 1]}$$

$$SB\langle 2\rangle = SG\langle 3\rangle \oplus SG\langle 2\rangle \quad \text{[Equation 2]}$$
$$= SB\langle 3\rangle \oplus SG\langle 2\rangle$$

$$SB\langle 1\rangle = SG\langle 3\rangle \oplus SG\langle 2\rangle \oplus SG\langle 1\rangle \quad \text{[Equation 3]}$$
$$= SB\langle 2\rangle \oplus SG\langle 1\rangle$$

$$SB\langle 0\rangle = SG\langle 3\rangle \oplus SG\langle 2\rangle \oplus SG\langle 1\rangle \oplus SG\langle 0\rangle \quad \text{[Equation 4]}$$
$$= SB\langle 1\rangle \oplus SG\langle 0\rangle$$

$$SB\langle 1\rangle = SG\langle 3\rangle \oplus SG\langle 2\rangle \oplus SG\langle 1\rangle \oplus SG\langle 0\rangle \oplus SG\langle 0\rangle \quad \text{[Equation 5]}$$
$$= SB\langle 0\rangle \oplus SG\langle 0\rangle$$

$$SB\langle 2\rangle = SG\langle 3\rangle \oplus SG\langle 2\rangle \oplus SG\langle 1\rangle \oplus SG\langle 1\rangle \quad \text{[Equation 6]}$$
$$= SB\langle 1\rangle \oplus SG\langle 1\rangle$$

$$SB\langle 3\rangle = SG\langle 3\rangle \oplus SG\langle 2\rangle \oplus SG\langle 2\rangle \quad \text{[Equation 7]}$$
$$= SB\langle 2\rangle \oplus SG\langle 2\rangle$$

In the Equations 1 through 7, a symbol $\oplus$ represents the XOR operation. To sequentially perform operations based on the Equations 1 through 7, the first latch unit 200a may sequentially output the first Gray code in an order from the fourth bit SG<3> (e.g., a MSB) to the first bit SG<0> (e.g., a LSB), and then sequentially output the first Gray code in an order from the first bit SG<0> to the third bit SG<2>.

For example, as illustrated in FIG. 4, at time t10 after time t9, a fourth switch control signal S3 is activated by transitioning from the logic high level to the logic low level. The first latch unit 200a outputs the fourth bit SG<3> of the first Gray code through the first signal line L1 in response to the fourth switch control signal S3. The first XOR gate 412 performs the XOR operation on the fourth bit SG<3> of the first Gray code and the first initial value (e.g., "0") stored in the first flip-flop 414, and generates the fourth bit SB<3> of the first binary code SIGB based on the Equation 1. The fourth bit SB<3> of the first binary code SIGB may be substantially the same as the fourth bit SG<3> of the first Gray code.

At time t11, the fourth bit SB<3> of the first binary code SIGB output from the first XOR gate 412 is stored in the first flip-flop 414. The fourth switch control signal S3 is deactivated by transitioning from the logic low level to the logic high level, and the third switch control signal S2 is activated by transitioning from the logic high level to the logic low level. The first latch unit 200a outputs the third bit SG<2> of the first Gray code through the first signal line L1 in response to the third switch control signal S2. The first XOR gate 412 performs the XOR operation on the third bit SG<2> of the first Gray code and the fourth bit SB<3> of the first binary code SIGB stored in the first flip-flop 414, and generates the third bit SB<2> of the first binary code SIGB based on the Equation 2.

At time t12, the third bit SB<2> of the first binary code SIGB output from the first XOR gate 412 is stored in the first flip-flop 414. The third switch control signal S2 is deactivated by transitioning from the logic low level to the logic high level, and the second switch control signal S1 is activated by transitioning from the logic high level to the logic low level. The first latch unit 200a outputs the second bit SG<1> of the first Gray code through the first signal line L1 in response to the second switch control signal S1. The first XOR gate 412 performs the XOR operation on the second bit SG<1> of the first Gray code and the third bit SB<2> of the first binary code SIGB stored in the first flip-flop 414, and generates the second bit SB<1> of the first binary code SIGB based on the Equation 3.

At time t13, the second bit SB<1> of the first binary code SIGB output from the first XOR gate 412 is stored in the first flip-flop 414. The second switch control signal S1 is deactivated by transitioning from the logic low level to the logic high level, and the first switch control signal S0 is activated by transitioning from the logic high level to the logic low level. The first latch unit 200a outputs the first bit SG<0> of the first Gray code through the first signal line L1 in response to the first switch control signal S0. The first XOR gate 412 performs the XOR operation on the first bit SG<0> of the first Gray code and the second bit SB<1> of the first binary code SIGB stored in the first flip-flop 414, and generates the first bit SB<0> of the first binary code SIGB based on the Equation 4.

At time t14, the first bit SB<0> of the first binary code SIGB output from the first XOR gate 412 is stored in the first flip-flop 414. The first switch control signal S0 maintains the logic low level (e.g., the activation state). The first latch unit 200a outputs the first bit SG<0> of the first Gray code in response to the first switch control signal S0. The first XOR gate 412 performs the XOR operation on the first bit SG<0> of the first Gray code and the first bit SB<0> of the first binary code SIGB stored in the first flip-flop 414, and generates the second bit SB<1> of the first binary code SIGB based on the Equation 5.

At time t15, the second bit SB<1> of the first binary code SIGB output from the first XOR gate 412 is stored in the first flip-flop 414. The first switch control signal S0 is deactivated, and the second switch control signal S1 is activated. The first latch unit 200a outputs the second bit SG<1> of the first Gray code in response to the second switch control signal S1. The first XOR gate 412 performs the XOR operation on the second bit SG<1> of the first Gray code and the second bit SB<1> of the first binary code SIGB stored in the first flip-flop 414, and generates the third bit SB<2> of the first binary code SIGB based on the Equation 6.

At time t16, the third bit SB<2> of the first binary code SIGB output from the first XOR gate 412 is stored in the first flip-flop 414. The second switch control signal S1 is deactivated, and the third switch control signal S2 is activated. The first latch unit 200a outputs the third bit SG<2> of the first Gray code in response to the third switch control signal S2. The first XOR gate 412 performs the XOR operation on the third bit SG<2> of the first Gray code and the third bit SB<2> of the first binary code SIGB stored in the first flip-flop 414, and generates the fourth bit SB<3> of the first binary code SIGB based on the Equation 7. At time t17, the fourth bit SB<3> of the first binary code SIGB output from the first XOR gate 412 is stored in the first flip-flop 414.

Similarly, at time t10, the second XOR gate 422 performs the XOR operation on the fourth bit RG<3> of the second Gray code output from the second latch unit 300a and the second initial value (e.g., "1") stored in the second flip-flop 424, and generates the fourth bit RB<3> of the second binary code RSTB. At time t11, the fourth bit RB<3> of the second binary code RSTB is stored in the second flip-flop 424. The second XOR gate 422 performs the XOR operation on the third bit RG<2> of the second Gray code output from the second latch unit 300a and the fourth bit RB<3> of the second binary code RSTB stored in the second flip-flop 424, and generates the third bit RB<2> of the second binary code RSTB. At time t12, the third bit RB<2> of the second binary code RSTB is stored in the second flip-flop 424. The second XOR gate 422 performs the XOR operation on the second bit RG<1> of the second Gray code output from the second latch unit 300a and the third bit RB<2> of the second binary code RSTB stored in the second flip-flop 424, and generates the second bit RB<1> of the second binary code RSTB. At time t13, the second bit RB<1> of the second binary code RSTB is stored in the second flip-flop 424. The second XOR gate 422 performs the XOR operation on the first bit RG<0> of the second Gray code output from the second latch unit 300a and the second bit RB<1> of the second binary code RSTB stored in the second flip-flop 424, and generates the first bit RB<0> of the second binary code RSTB.

At time t14, the first bit RB<0> of the second binary code RSTB is stored in the second flip-flop 424. The second XOR gate 422 performs the XOR operation on the first bit RG<0> of the second Gray code output from the second latch unit 300a and the first bit RB<0> of the second binary code RSTB stored in the second flip-flop 424, and generates the second bit RB<1> of the second binary code RSTB. At time t15, the second bit RB<1> of the second binary code RSTB is stored in the second flip-flop 424. The second XOR gate 422 performs the XOR operation on the second bit RG<1> of the second Gray code output from the second latch unit 300a and the second bit RB<1> of the second binary code RSTB stored in the second flip-flop 424, and generates the third bit RB<2> of the second binary code RSTB. At time t16, the third bit RB<2> of the second binary code RSTB is stored in the second flip-flop 424. The second XOR gate 422 performs the XOR operation on the third bit RG<2> of the second Gray code output from the second latch unit 300a and the third bit RB<2> of the second binary code RSTB stored in the second flip-flop 424, and generates the fourth bit RB<3> of the second binary code RSTB. At time t17, the fourth bit RB<3> of the second binary code RSTB is stored in the second flip-flop 424.

In addition, at time t15, the 1-bit full adder 430 generates the first bit IB<0> of the digital effective image data based on the first bit SB<0> of the first binary code SIGB stored in the first flip-flop 414 and the first bit RB<0> of the second binary code RSTB stored in the second flip-flop 424. At time t16, the 1-bit full adder 430 generates the second bit IB<1> of the digital effective image data based on the second bit SB<1> of the first binary code SIGB stored in the first flip-flop 414 and the second bit RB<1> of the second binary code RSTB stored in the second flip-flop 424. At time t17, the 1-bit full adder 430 generates the third bit IB<2> of the digital effective image data based on the third bit SB<2> of the first binary code SIGB stored in the first flip-flop 414 and the third bit RB<2> of the second binary code RSTB stored in the second flip-flop 424. At time t18, the 1-bit full adder 430 generates the fourth bit IB<3> of the digital effective image data based on the fourth bit SB<3> of the first binary code SIGB stored in the first flip-flop 414 and the fourth bit RB<3> of the second binary code RSTB stored in the second flip-flop 424.

In some example embodiments, a third initial value that is stored in the flip-flop 432 at the initial operation time of the digital CDS circuit 100a may be "1." For example, the second binary code RSTB generated from the second Gray-to-binary converter 420a may be a 1's complement code of a binary code that is generated by performing the Gray-to-binary conversion on the second Gray code, and thus the third initial value may be set as "1" for converting the 1's complement code into a 2's complement code and for compensating the digital effective image data.

In other example embodiments, the third initial value that is stored in the flip-flop 432 at the initial operation time of the digital CDS circuit 100a may be "0." For example, the digital CDS circuit 100a does not convert the 1's complement code into the 2's complement code, and a digital signal processing unit (not illustrated) that is disposed at the later stage of the digital CDS circuit 100a may compensate the digital effective image data.

Figure 5:
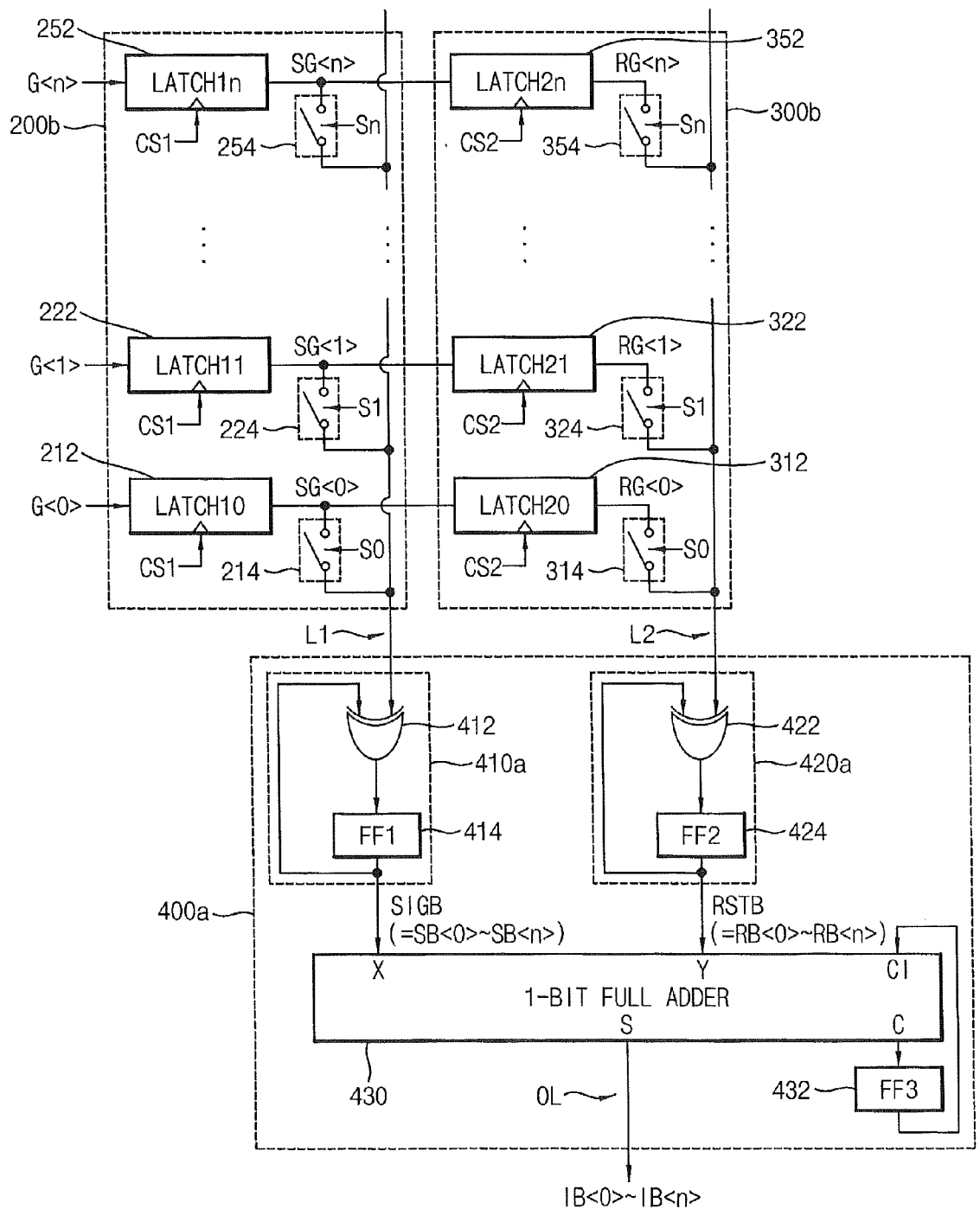
FIG. 5 is a diagram illustrating another example of the digital CDS circuit of FIG. 1.

FIG. 5 is a diagram illustrating another example of the digital CDS circuit of FIG. 1.

Referring to FIG. 5, a digital CDS circuit 100b includes a first latch unit 200b, a second latch unit 300b and a calculating unit 400a.

The digital CDS circuit 100b of FIG. 5 may be similar to the digital CDS circuit 100a of FIG. 2, except that the digital CDS circuit 100b of FIG. 5 generates (n+1)-bit digital effective image data (e.g., a (n+1)-bit binary code including bits IB<0>~IB<n>) based on (n+1)-bit digital image component data (e.g., a (n+1)-bit first Gray code including bits SG<0>, SG<1>, . . . , SG<n>) and (n+1)-bit digital reset component data (e.g., a (n+1)-bit second Gray code including bits RG<0>, RG<1>, . . . , RG<n>).

The first latch unit 200b may include a plurality of image latches 212, 222, . . . , 252 and a plurality of image output switches 214, 224, . . . , 254. Each of the plurality of image latches 212, 222, . . . , 252 may store a respective one of bits RG<0>, RG<1>, . . . , RG<n> of the digital reset component data by latching a respective one of bits G<0>, G<1>, G<n> of the count signal in response to the first control signal CS1, and then may store a respective one of bits SG<0>, SG<1>, . . . , SG<n> of the digital image component data by latching the respective one of the bits G<0>, G<1>, . . . , G<n> of the count signal in response to the first control signal CS1. Each of the plurality of image output switches 214, 224, . . . , 254 may selectively connect an output terminal of a respective one of the plurality of image latches 212, 222, . . . , 252 with the first signal line L1 in response to a respective one of a plurality of switch control signals S0, S1, . . . , Sn.

The second latch unit 300b may include a plurality of reset latches 312, 322, . . . , 352 and a plurality of reset output switches 314, 324, . . . , 354. Each of the plurality of reset latches 312, 322, . . . , 352 may be connected to the output terminal of the respective one of the plurality of image latches 212, 222, . . . , 252, and may store the respective one of the bits RG<0>, RG<1>, . . . , RG<n> of the digital reset component data by latching an output of the respective one of the plurality of image latches 212, 222, . . . , 252 in response to the second control signal CS2. Each of the plurality of reset output switches 314, 324, . . . , 354 may selectively connect an output terminal of a respective one of the plurality of reset latches 312, 322, . . . , 352 with the second signal line L2 in response to the respective one of the plurality of switch control signals S0, S1, . . . , Sn.

The calculating unit 400a may include a first Gray-to-binary converter 410a, a second Gray-to-binary converter 420a and a 1-bit full adder 430. The calculating unit 400a may further include a flip-flop 432. The first Gray-to-binary converter 410a, the second Gray-to-binary converter 420a and the 1-bit full adder 430 in FIG. 5 may be similar to the first Gray-to-binary converter 410a, the second Gray-to-binary converter 420a and the 1-bit full adder 430 in FIG. 2, respectively, except that a first binary code SIGB generated from the first Gray-to-binary converter 410a in FIG. 5 includes first through (n+1)-th bits SB<0>~SB<n>, a second binary code RSTB generated from the second Gray-to-binary converter 420a in FIG. 5 includes first through (n+1)-th bits RB<0>~RB<n>, and digital effective image data generated from the 1-bit full adder 430 in FIG. 5 includes the first through (n+1)-th bits IB<0>~IB<n>.

Figure 6:
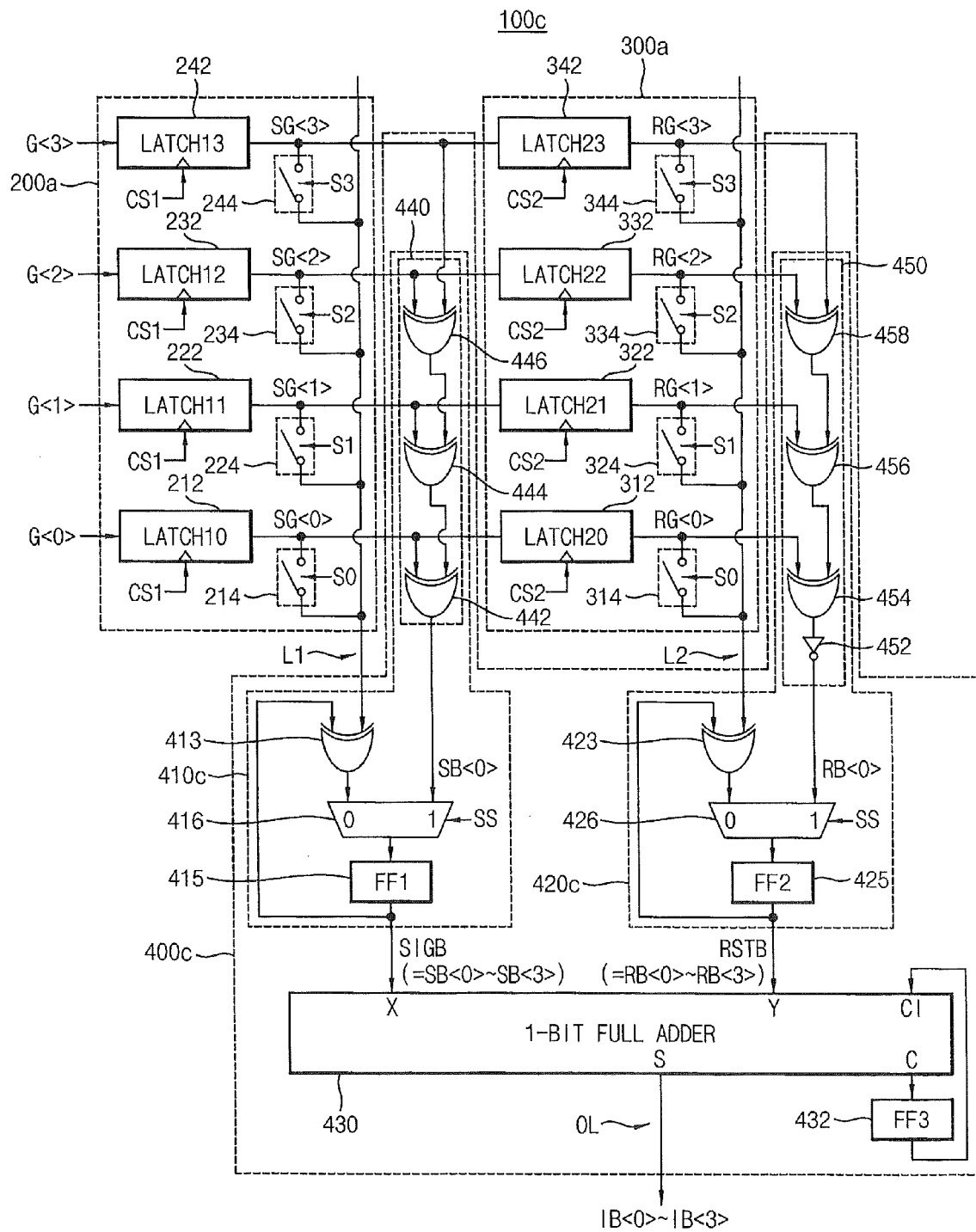
FIG. 6 is a diagram illustrating still another example of the digital CDS circuit of FIG. 1.

FIG. 6 is a diagram illustrating still another example of the digital CDS circuit of FIG. 1.

Referring to FIG. 6, a digital CDS circuit 100c includes a first latch unit 200a, a second latch unit 300a and a calculating unit 400c.

The digital CDS circuit 100c in FIG. 6 may generate 4-bit digital effective image data (e.g., a 4-bit binary code including bits IB<0>~IB<3>) based on 4-bit digital image component data (e.g., a 4-bit first Gray code including bits SG<0>~SG<3>) and 4-bit digital reset component data (e.g., a 4-bit second Gray code including bits RG<0>~RG<3>).

The first latch unit 200a and the second latch unit 300a in FIG. 6 may be substantially the same as the first latch unit 200a and the second latch unit 300a in FIG. 2, respectively. For example, the first latch unit 200a may include a plurality of image latches 212, 222, 232 and 242 and a plurality of image output switches 214, 224, 234 and 244. The second latch unit 300a may include a plurality of reset latches 312, 322, 332 and 342 and a plurality of reset output switches 314, 324, 334 and 344.

According to example embodiments, the image output switch 244 and the reset output switch 344 may be omitted in FIG. 6.

The calculating unit 400c may include a first Gray-to-binary converter 410c, a second Gray-to-binary converter 420c and a 1-bit full adder 430. The calculating unit 400c may further include a flip-flop 432.

The first Gray-to-binary converter 410c may generate a first binary code SIGB by performing a Gray-to-binary conversion on the digital image component data bit by bit. The first Gray-to-binary converter 410c may include a first XOR gate 413, a first binary bit generator 440, a first multiplexer 416 and a first flip-flop 415.

The first binary bit generator 440 may generate a first bit SB<0> of the first binary code SIGB by performing a XOR operation on all bits SG<0>, SG<1>, SG<2> and SG<3> of the digital image component data. The first binary bit generator 440 may include a plurality of XOR gates 442, 444 and 446. The XOR gate 446 may perform the XOR operation on the fourth bit SG<3> and the third bit SG<2> of the digital image component data. The XOR gate 444 may perform the XOR operation on an output of the XOR gate 446 and the second bit SG<1> of the digital image component data. The XOR gate 442 may perform the XOR operation on an output of the XOR gate 444 and the first bit SG<0> of the digital image component data and may output the first bit SB<0> of the first binary code SIGB.

The first multiplexer 416 may select one of an output of the first XOR gate 413 and an output of the first binary bit generator 440 based on a selection signal SS. The first flip-flop 415 may store an output of the first multiplexer 416. The first XOR gate 413 may generate one bit of the first binary code SIGB except the first bit SB<0> (e.g., a LSB) by performing the XOR operation on one bit of the digital image component data and an output of the first flip-flop 415.

The second Gray-to-binary converter 420c may generate a second binary code RSTB by performing the Gray-to-binary conversion and a complement conversion on the digital reset component data bit by bit. The second Gray-to-binary converter 420c may include a second XOR gate 423, a second binary bit generator 450, a second multiplexer 426 and a second flip-flop 425.

The second binary bit generator 450 may generate a first bit RB<0> of the second binary code RSTB by performing the XOR operation on all bits RG<0>, RG<1>, RG<2> and RG<3> of the digital reset component data and by inverting a result of the XOR operation on the all bits RG<0>, RG<1>, RG<2> and RG<3> of the digital reset component data. The second Gray-to-binary converter 420c may include an inverter 452 and a plurality of XOR gates 454, 456 and 458. The XOR gate 458 may perform the XOR operation on the fourth bit RG<3> and the third bit RG<2> of the digital reset component data. The XOR gate 456 may perform the XOR operation on an output of the XOR gate 458 and the second bit RG<1> of the digital reset component data. The XOR gate 454 may perform the XOR operation on an output of the XOR gate 456 and the first bit SG<0> of the digital reset component data. The inverter 452 may invert an output of the XOR gate 454 and may output the first bit RB<0> of the second binary code RSTB.

The second multiplexer 426 may select one of an output of the second XOR gate 423 and an output of the second binary bit generator 450 in response to the selection signal SS. The second flip-flop 425 may store an output of the second multiplexer 426. The second XOR gate 423 may generate one bit of the second binary code RSTB except the first bit RB<0> (e.g., a LSB) by performing the XOR operation on one bit of the digital reset component data and an output of the second flip-flop 425.

The calculating unit 400c may sequentially generate the bits SB<0>~SB<3> of the first binary code SIGB based on the bits SG<0>~SG<3> of the first Gray code, may sequentially generate the bits RB<0>~RB<3> of the second binary code RSTB based on the bits RG<0>~RG<3> of the first Gray code, and may generate the bits IB<0>~IB<3> of the digital effective image data by sequentially adding the bits SB<0>~SB<3> of the first binary code SIGB and the bits RB<0>~RB<3> of the second binary code RSTB. For example, the calculating unit 400c may generate the first bit SB<0> of the first binary code SIGB based on the all bits SG<0>~SG<3> of the first Gray code, may generate the first bit RB<0> of the second binary code RSTB based on the all bits RG<0>~RG<3> of the second Gray code, and may generate the first bit IB<0> of the digital effective image data based on the first bit SB<0> of the first binary code SIGB and the first bit RB<0> of the second binary code RSTB.

In an example of FIG. 6, the first latch unit 200a may simultaneously or concurrently output the all bits SG<0>~SG<3> of the first Gray code to the calculating unit 400c. The second latch unit 300a may simultaneously output the all bits RG<0>~RG<3> of the second Gray code to the calculating unit 400c. The calculating unit 400c may generate the first bit SB<0> of the first binary code SIGB by performing the XOR operation on the all bits SG<0>~SG<3> of the first Gray code and may generate the first bit RB<0> of the second binary code RSTB by performing the XOR operation on the all bits RG<0>~RG<3> of the second Gray code.

In addition, the calculating unit 400c may generate the second bit (e.g., SB<1> in FIG. 7) of the first binary code SIGB based on the first bit SB<0> of the first binary code SIGB and the first bit SG<0> of the first Gray code, may generate the second bit (e.g., RB<1> in FIG. 7) of the second binary code RSTB based on the first bit RB<0> of the second binary code RSTB and the first bit RG<0> of the second Gray code, and may generate the second bit (e.g., IB<1> in FIG. 7) of the digital effective image data based on the second bit (e.g., SB<1> in FIG. 7) of the first binary code SIGB and the second bit (e.g., RB<1> in FIG. 7) of the second binary code RSTB.

Figure 7:
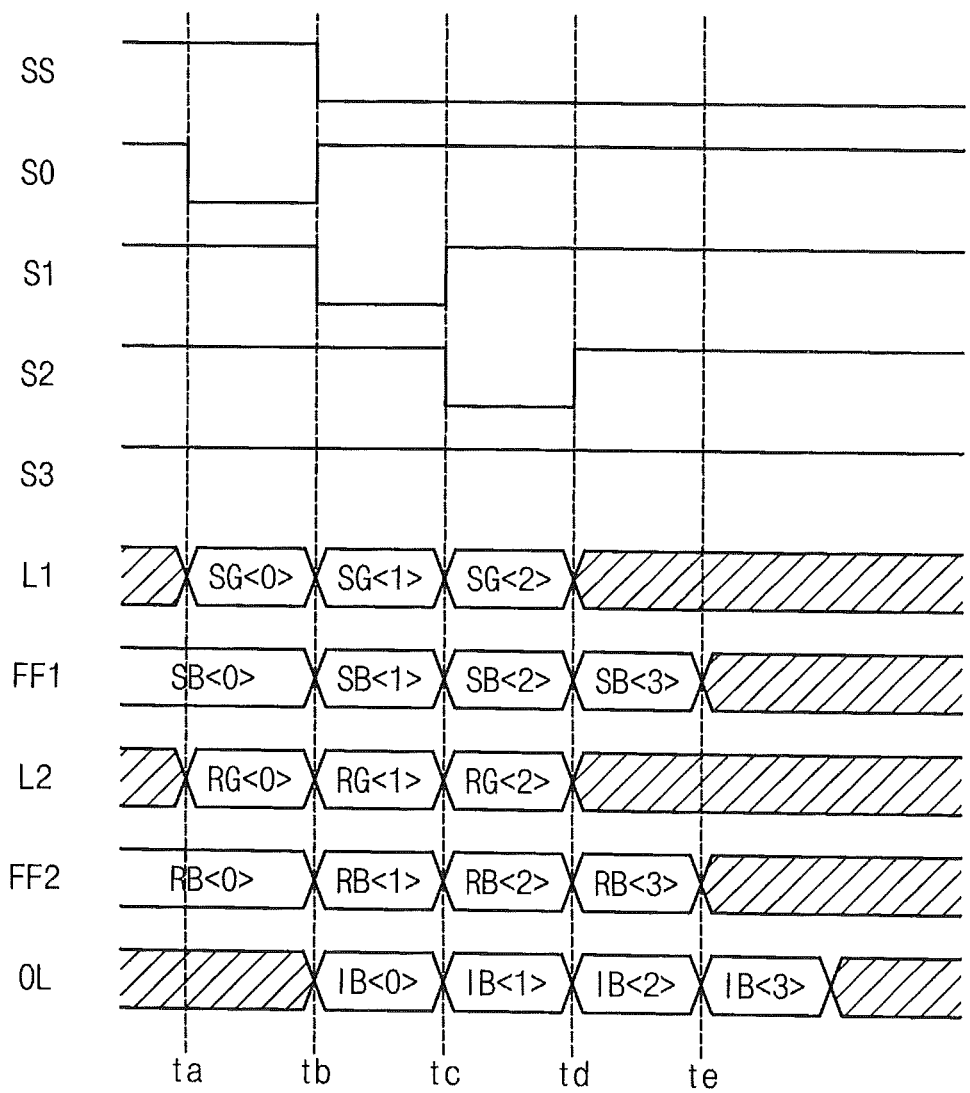
FIG. 7 is a timing diagram for describing an operation of the digital CDS circuit of FIG. 6.

FIG. 7 is a timing diagram for describing an operation of the digital CDS circuit of FIG. 6.

FIG. 7 illustrates that the calculating unit 400c in FIG. 6 generates the bits IB<0>~IB<3> of the digital effective image data based on the bits SG<0>~SG<3> of the first Gray code and the bits RG<0>~RG<3> of the second Gray code. The operations of storing the bits SG<0>~SG<3> of the first Gray code in the first latch unit 200a in FIG. 6 and storing the bits RG<0>~RG<3> of the second Gray code in the second latch unit 300a in FIG. 6 may be substantially the same as the operations described above with reference to FIG. 3.

Hereinafter, the operation of the digital CDS circuit 100c according to example embodiments will be described in detail with reference to FIGS. 6 and 7.

At a time point after time t9 in FIG. 3 and before time ta in FIG. 7, the first binary bit generator 440 included in the digital CDS circuit 100c of FIG. 6 may generate the first bit SB<0> (e.g., the LSB) of the first binary code SIGB based on Equation 8.

$$SB\langle 0\rangle = SG\langle 3\rangle \oplus SG\langle 2\rangle \oplus SG\langle 1\rangle \oplus SG\langle 0\rangle \quad \text{[Equation 8]}$$

Before time ta, the selection signal SS has the logic high level. The first multiplexer 416 selects the first bit SB<0> of the first binary code SIGB output from the first binary bit generator 440 in response to the selection signal SS. The first flip-flop 415 stores the first bit SB<0> of the first binary code SIGB output from the first multiplexer 416.

At time ta, the first switch control signal S0 is activated by transitioning from the logic high level to the logic low level. The first latch unit 200a outputs the first bit SG<0> of the first Gray code through the first signal line L1 in response to the first switch control signal S0. The first XOR gate 413 performs the XOR operation on the first bit SG<0> of the first Gray code and the first bit SB<0> of the first binary code SIGB stored in the first flip-flop 415, and generates the second bit SB<1> of the first binary code SIGB based on the Equation 5.

At time tb, the selection signal SS is transitioned from the logic high level to the logic low level. The first multiplexer 416 selects the second bit SB<1> of the first binary code SIGB output from the first XOR gate 413 in response to the selection signal SS. The first flip-flop 415 stores the second bit SB<1> of the first binary code SIGB output from the first multiplexer 416. In addition, at time tb, the first switch control signal S0 is deactivated by transitioning from the logic low level to the logic high level, and the second switch control signal S1 is activated by transitioning from the logic high level to the logic low level. The first latch unit 200a outputs the second bit SG<1> of the first Gray code through the first signal line L1 in response to the second switch control signal S1. The first XOR gate 413 performs the XOR operation on the second bit SG<1> of the first Gray code and the second bit SB<1> of the first binary code SIGB stored in the first flip-flop 415, and generates the third bit SB<2> of the first binary code SIGB based on the Equation 6.

At time tc, the first multiplexer 416 selects the third bit SB<2> of the first binary code SIGB output from the first XOR gate 413 in response to the selection signal SS. The first flip-flop 415 stores the third bit SB<2> of the first binary code SIGB output from the first multiplexer 416. In addition, at time tc, the second switch control signal S1 is deactivated by transitioning from the logic low level to the logic high level, and the third switch control signal S2 is activated by transitioning from the logic high level to the logic low level. The first latch unit 200a outputs the third bit SG<2> of the first Gray code through the first signal line L1 in response to the third switch control signal S2. The first XOR gate 413 performs the XOR operation on the third bit SG<2> of the first Gray code and the third bit SB<2> of the first binary code SIGB stored in the first flip-flop 415, and generates the fourth bit SB<3> of the first binary code SIGB based on the Equation 7.

At time td, the first multiplexer 416 selects the fourth bit SB<3> of the first binary code SIGB output from the first XOR gate 413 in response to the selection signal SS. The first flip-flop 415 stores the fourth bit SB<3> of the first binary code SIGB output from the first multiplexer 416.

Similarly, before time ta, the second multiplexer 426 selects the first bit RB<0> of the second binary code RSTB output from the second binary bit generator 450 in response to the selection signal SS. The second flip-flop 425 stores the first bit RB<0> of the second binary code RSTB output from the second multiplexer 426. At time ta, the second XOR gate 423 performs the XOR operation on the first bit RG<0> of the second Gray code output from the second latch unit 300a and the first bit RB<0> of the second binary code RSTB stored in the second flip-flop 425, and generates the second bit RB<1> of the second binary code RSTB. At time tb, the second multiplexer 426 selects the second bit RB<1> of the second binary code RSTB output from the second XOR gate 423 in response to the selection signal SS, and the second flip-flop 425 stores the second bit RB<1> of the second binary code RSTB output from the second multiplexer 426. The second XOR gate 423 performs the XOR operation on the second bit RG<1> of the second Gray code output from the second latch unit 300a and the second bit RB<1> of the second binary code RSTB stored in the second flip-flop 425, and generates the third bit RB<2> of the second binary code RSTB. At time tc, the second multiplexer 426 selects the third bit RB<2> of the second binary code RSTB output from the second XOR gate 423 in response to the selection signal SS, and the second flip-flop 425 stores the third bit RB<2> of the second binary code RSTB output from the second multiplexer 426. The second XOR gate 423 performs the XOR operation on the third bit RG<2> of the second Gray code output from the second latch unit 300a and the third bit RB<2> of the second binary code RSTB stored in the second flip-flop 425, and generates the fourth bit RB<3> of the second binary code RSTB. At time td, the second multiplexer 426 selects the fourth bit RB<3> of the second binary code RSTB output from the second XOR gate 423 in response to the selection signal SS, and the second flip-flop 425 stores the fourth bit RB<3> of the second binary code RSTB output from the second multiplexer 426.

In addition, at time tb, the 1-bit full adder 430 generates the first bit IB<0> of the digital effective image data based on the first bit SB<0> of the first binary code SIGB stored in the first flip-flop 415 and the first bit RB<0> of the second binary code RSTB stored in the second flip-flop 425. At time tc, the 1-bit full adder 430 generates the second bit IB<1> of the digital effective image data based on the second bit SB<1> of the first binary code SIGB stored in the first flip-flop 415 and the second bit RB<1> of the second binary code RSTB stored in the second flip-flop 425. At time td, the 1-bit full adder 430 generates the third bit IB<2> of the digital effective image data based on the third bit SB<2> of the first binary code SIGB stored in the first flip-flop 415 and the third bit RB<2> of the second binary code RSTB stored in the second flip-flop 425. At time te, the 1-bit full adder 430 generates the fourth bit IB<3> of the digital effective image data based on the fourth bit SB<3> of the first binary code SIGB stored in the first flip-flop 415 and the fourth bit RB<3> of the second binary code RSTB stored in the second flip-flop 425.

In comparison with the example of FIG. 4, a time required to generate the first bit IB<0> of the digital effective image data may be reduced in the example of FIG. 7 (e.g., reduced by a time period from t10 to time t14 in FIG. 4). In other words, in comparison with the digital CDS circuit 100a of FIG. 2, the digital CDS circuit 100c of FIG. 6 may further include the multiplexers 416 and 426 and the binary bit generators 440 and 450, and thus, the digital CDS circuit 100c of FIG. 6 may have an advantage of timing (e.g., by the time period from t10 to time t14 in FIG. 4) in the operation of generating the digital effective image data.

Figure 8:
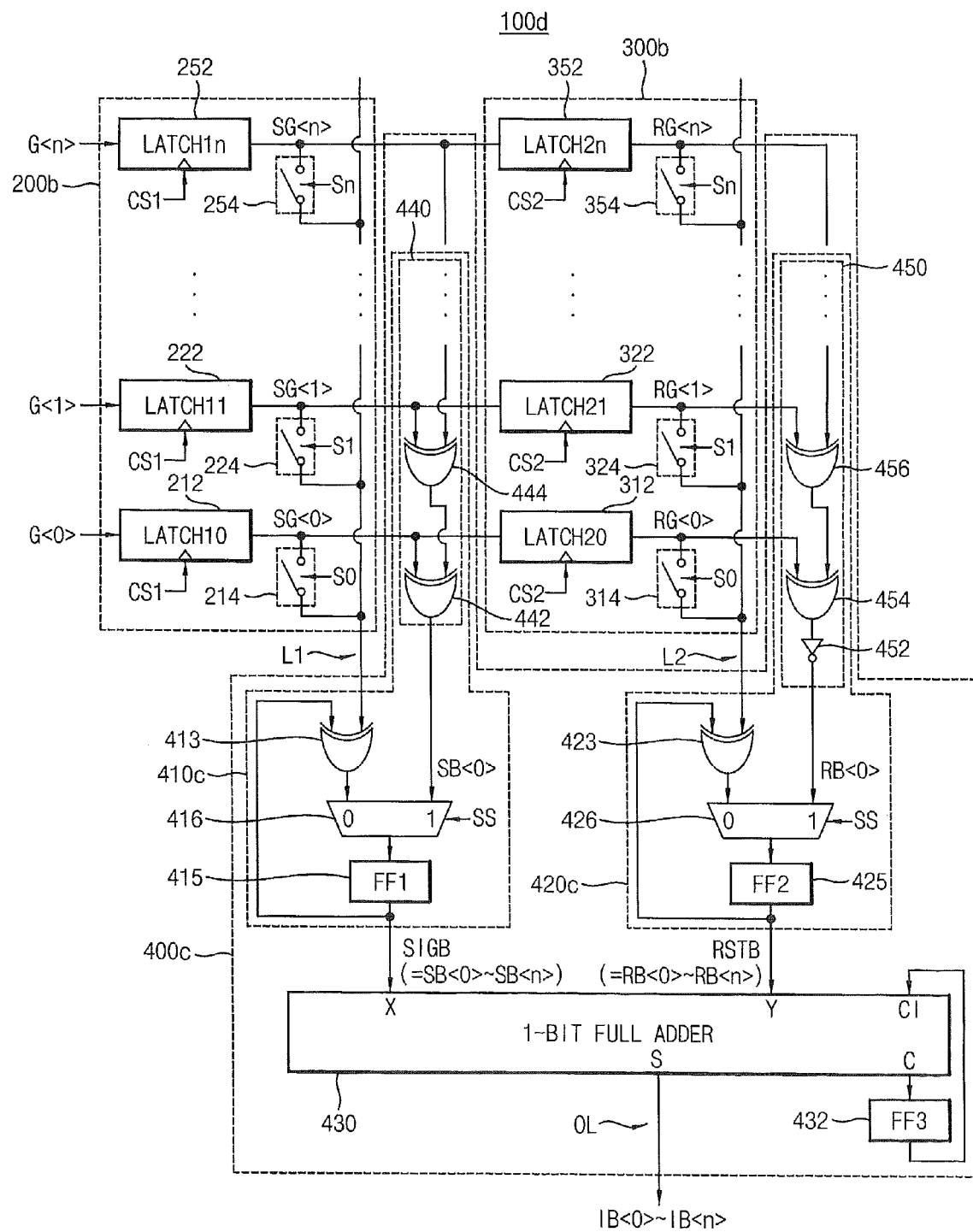
FIG. 8 is a diagram illustrating still another example of the digital CDS circuit of FIG. 1.

FIG. 8 is a diagram illustrating still another example of the digital CDS circuit of FIG. 1.

Referring to FIG. 8, a digital CDS circuit 100d includes a first latch unit 200b, a second latch unit 300b and a calculating unit 400c.

The digital CDS circuit 100d of FIG. 8 may be similar to the digital CDS circuit 100c of FIG. 6, except that the digital CDS circuit 100d of FIG. 8 generates (n+1)-bit digital effective image data (e.g., a (n+1)-bit binary code including bits IB<0>~IB<n>) based on (n+1)-bit digital image component data (e.g., a (n+1)-bit first Gray code including bits SG<0>, SG<1>, . . . , SG<n>) and (n+1)-bit digital reset component data (e.g., a (n+1)-bit second Gray code including bits RG<0>, RG<1>, . . . , RG<n>).

The first latch unit 200b may include a plurality of image latches 212, 222, . . . , 252 and a plurality of image output switches 214, 224, . . . , 254. The second latch unit 300b may include a plurality of reset latches 312, 322, . . . , 352 and a plurality of reset output switches 314, 324, . . . , 354. The first latch unit 200b and the second latch unit 300b in FIG. 8 may be substantially the same as the first latch unit 200b and the second latch unit 300b in FIG. 5, respectively. According to example embodiments, the image output switch 254 and the reset output switch 354 may be omitted in FIG. 8.

The calculating unit 400c may include a first Gray-to-binary converter 410c, a second Gray-to-binary converter 420c and a 1-bit full adder 430. The calculating unit 400c may further include a flip-flop 432. The first Gray-to-binary converter 410c, the second Gray-to-binary converter 420c and the 1-bit full adder 430 in FIG. 8 may be similar to the first Gray-to-binary converter 410c, the second Gray-to-binary converter 420c and the 1-bit full adder 430 in FIG. 6, respectively, except that a first binary code SIGB generated from the first Gray-to-binary converter 410c in FIG. 8 includes first through (n+1)-th bits SB<0>~SB<n>, a second binary code RSTB generated from the second Gray-to-binary converter 420c in FIG. 8 includes first through (n+1)-th bits RB<0>~RB<n>, and digital effective image data generated from the 1-bit full adder 430 in FIG. 8 includes the first through (n+1)-th bits IB<0>~IB<n>.

Figure 9:
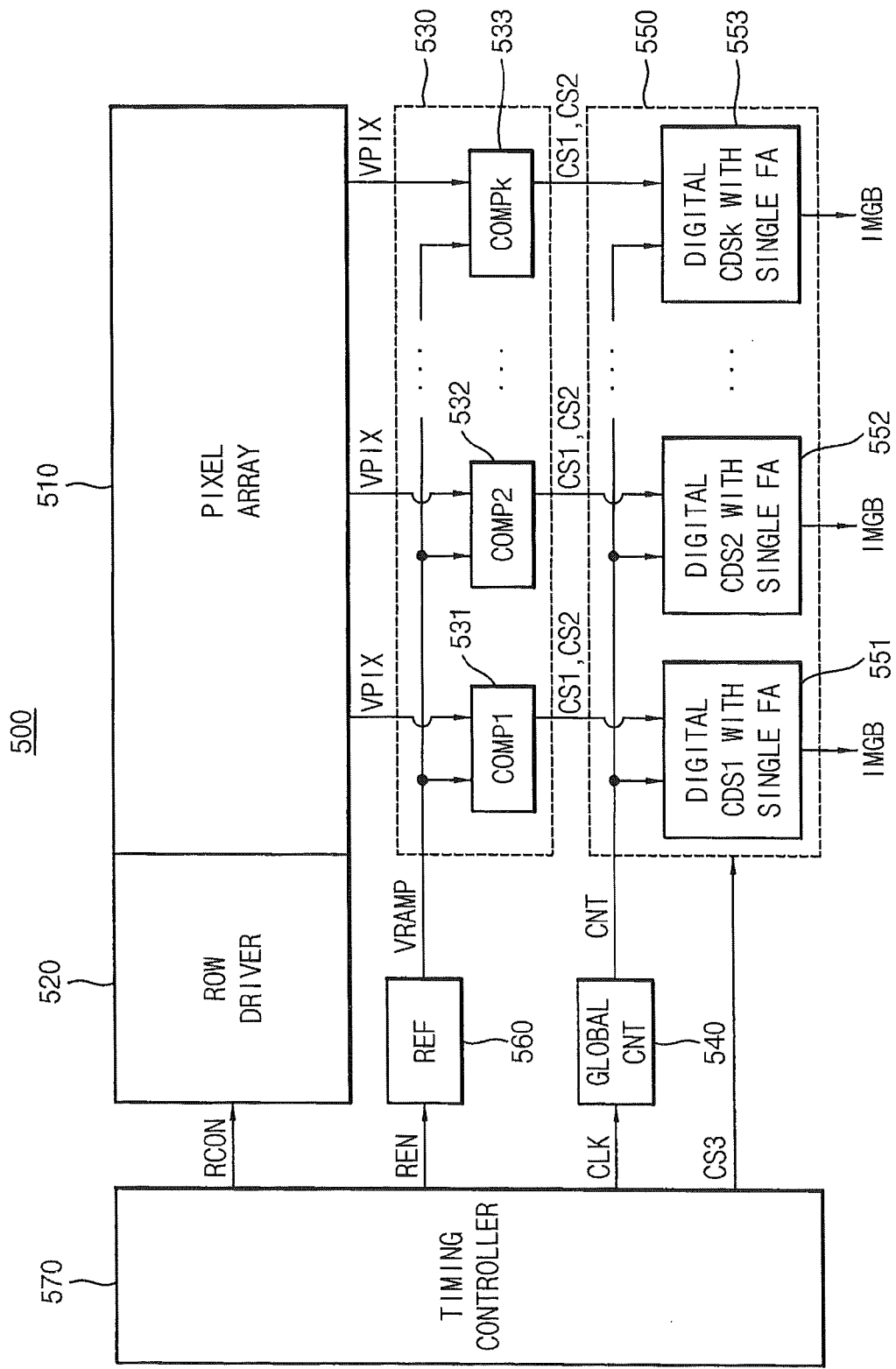
FIG. 9 is a block diagram illustrating an image sensor including the digital CDS circuit according to example embodiments.

FIG. 9 is a block diagram illustrating an image sensor including the digital CDS circuit according to example embodiments.

Referring to FIG. 9, an image sensor 500 includes a pixel array 510, a comparison block 530, a global counter 540 and a digital correlated double sampling (CDS) block 550.

The image sensor 500 may further include a row driver 520, a voltage generator 560 and a timing controller 570.

The pixel array 510 generates a plurality of analog pixel signals VPIX based on incident light. The pixel array 510 may include a plurality of unit pixels that are arranged in a matrix of a plurality of rows and a plurality of columns.

Figure 10:
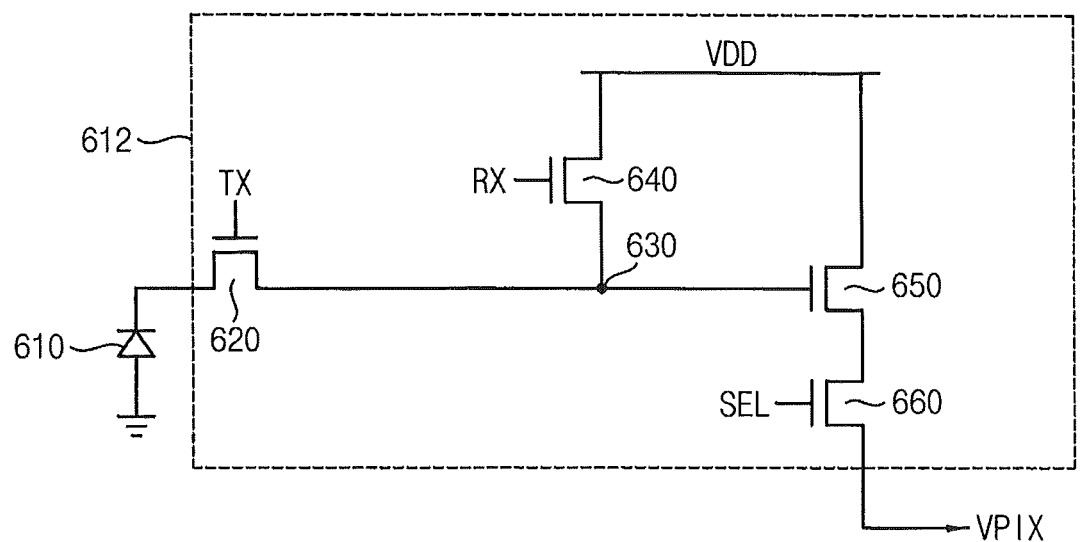
FIG. 10 is a circuit diagram illustrating an example of a unit pixel included in the image sensor of FIG. 9.

FIG. 10 is a circuit diagram illustrating an example of a unit pixel included in the image sensor of FIG. 9.

Referring to FIG. 10, a unit pixel 600 may include a photoelectric conversion unit 610 and a signal generation unit 612.

The photoelectric conversion unit 610 may perform a photoelectric conversion operation. For example, the photoelectric conversion unit 610 may convert the incident light into photo-charges during an integration mode. If an image sensor including the unit pixel 600 is a CMOS image sensor, image information on an object to be captured may be obtained by collecting charge carriers (e.g., electron-hole pairs) in the photoelectric conversion unit 610 proportional to intensity of the incident light through an open shutter of the CMOS image sensor during the integration mode The signal generation unit 612 may generate an electric signal (e.g., the analog pixel signal VPIX) based on the photo-charges generated by the photoelectric conversion operation during a readout mode. If the image sensor including the unit pixel 600 is the CMOS image sensor, the shutter may be closed, and the analog pixel signal VPIX may be generated based on the image information in a form of the charge carriers during the readout mode after the integration mode.

The unit pixel may have various structures including, for example, one-transistor structure, three-transistor structure, four-transistor structure, five-transistor structure, structure where some transistors are shared by a plurality of unit pixels, etc. For example, as illustrated in FIG. 10, the unit pixel 600 may have four-transistor structure. In this case, the signal generation unit 612 may include a transfer transistor 620, a reset transistor 640, a drive transistor 650, a selection transistor 660 and a floating diffusion node 630.

The transfer transistor 620 may include a first electrode connected to the photoelectric conversion unit 610, a second electrode connected to the floating diffusion node 630, and a gate electrode receiving a transfer signal TX. The reset transistor 640 may include a first electrode receiving a power supply voltage VDD, a second electrode connected to the floating diffusion node 630, and a gate electrode receiving a reset signal RST. The drive transistor 650 may include a first electrode receiving the power supply voltage VDD, a gate electrode connected to the floating diffusion node 630, and a second electrode. The selection transistor 660 may include a first electrode connected to the second electrode of the drive transistor 650, a gate electrode receiving a selection signal SEL, and a second electrode outputting the analog pixel signal VPIX.

Referring back to FIG. 9, the row driver 520, the comparison block 530, the global counter 540, the digital CDS block 550, the voltage generator 560 and the timing controller 570 may be included in a signal processing unit that generates a plurality of digital effective image data IMGB based on the analog pixel signals VPIX.

The row driver 520 may be connected with each row of the pixel array 510. The row driver 520 may generate driving signals to drive each row. For example, the row driver 520 may drive the plurality of unit pixels included in the pixel array 510 row by row. The voltage generator 560 may generate a ramp signal VRAMP in response to a ramp enable signal REN.

The comparison block 530 generates a plurality of first control signals CS1 and a plurality of second control signals CS2 by comparing the plurality of analog pixel signals VPIX with the ramp signal VRAMP. The comparison block 530 includes a plurality of comparators 531, 532, . . . , 533. Each of the plurality of comparators 531, 532, . . . , 533 is connected with each column of the pixel array 510 and receives a respective one of the plurality of analog pixel signals VPIX.

The global counter 540 generates a count signal CNT in response to a clock signal CLK. For example, the global counter 540 may be a Gray code counter, and the count signal CNT may be a Gray code count signal.

The digital CDS block 550 generates the plurality of digital effective image data IMGB corresponding to the plurality of analog pixel signals VPIX by performing a digital CDS in response to the plurality of first and second control signals CS1 and CS2 and the count signal CNT. The digital CDS block 550 includes a plurality of digital CDS circuits 551, 552, . . . , 553. Each of the plurality of digital CDS circuits 551, 552, . . . , 553 is connected to a respective one of the plurality of comparators 531, 532, . . . , 533 and may receive a respective one of the plurality of first control signals CS1 and a respective one of the plurality of second control signals CS2.

The comparison block 530, the global counter 540 and the digital CDS block 550 may be included in an analog-to-digital converting (ADC) unit.

Each of the plurality of digital CDS circuits 551, 552, . . . , 553 may be the digital CDS circuit 100 of FIG. 1 and may be implemented with the examples described above with reference to FIGS. 2, 5, 6 and 8. In other words, each of the plurality of digital CDS circuits 551, 552, . . . , 553 includes a first latch unit storing digital image component data, a second latch unit storing digital reset component data and a calculating unit generating the digital effective image data IMGB based on the digital image component data and the digital reset component data and outputting the digital effective image data IMGB bit by bit through one signal line. The first and second latch units may provide the digital image component data and the digital reset component data to the calculating unit in response to a third control signal CS3. Each of the plurality of digital CDS circuits 551, 552, . . . , 553 may include two latch units and one calculating unit having a single 1-bit full adder, and thus each of the plurality of digital CDS circuits 551, 552, . . . , 553 and the image sensor 500 including the digital CDS circuits 551, 552, . . . , 553 may have relatively simple structures and relatively small sizes.

The timing controller 570 may control the row driver 520, the comparison block 530, the global counter 540, the digital CDS block 550 and the voltage generator 560. The timing controller 570 may generate a row driver control signal RCON, the ramp enable signal REN, the clock signal CLK, the third control signal CS3, etc.

Although not illustrated in FIG. 9, the image sensor may further include a digital signal processing (DSP) unit (not illustrated) that performs an image data processing on the plurality of digital effective image data IMGB.

Figure 11:
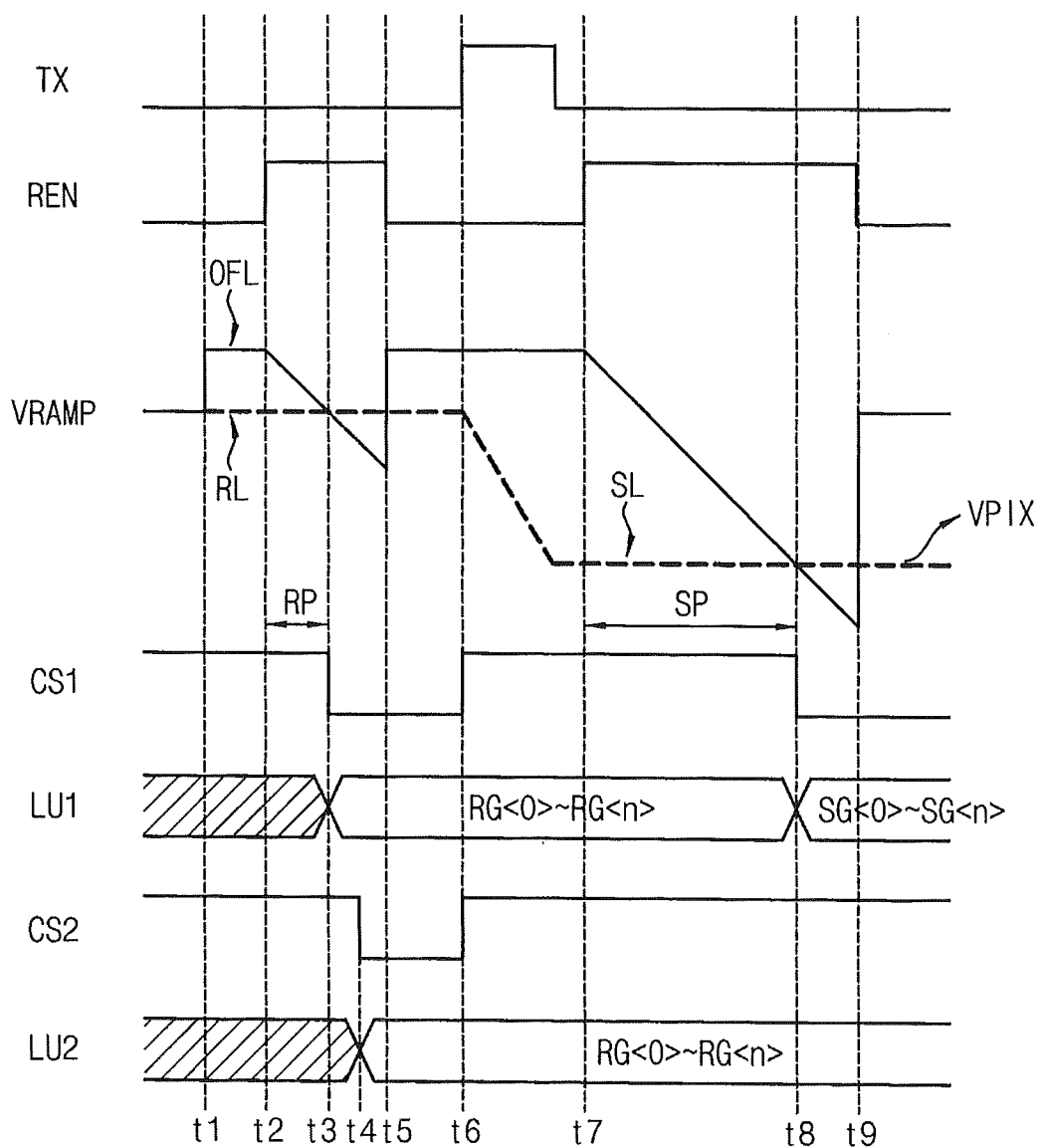
FIG. 11 is a timing diagram for describing an operation of the image sensor of FIG. 9.

FIG. 11 is a timing diagram for describing an operation of the image sensor of FIG. 9.

Hereinafter, the operation of the image sensor 500 according to example embodiments will be described in detail with reference to FIGS. 9, 10 and 11.

When an external light is incident onto the photoelectric conversion unit 610 during the integration mode, electron-hole pairs are generated in proportion to the amount of the incident light.

During the readout mode after the integration mode, the selection signal SEL is activated, and a first row of the pixel array 510 connected to the unit pixel 600 is selected in response to the selection signal SEL. In addition, the reset signal RX is activated, the reset transistor 640 is turned on in response to the reset signal RX, and an electric potential of the floating diffusion node 630, which is a sensing node, is reset to the power supply voltage VDD. The analog pixel signal VPIX output from the unit pixel 600 has a reset level RL corresponding to a reset state of the floating diffusion node 630.

At time t1, the ramp signal VRAMP has an offset level OFL. At time t2, the ramp enable signal REN is activated, and thus the ramp signal VRAMP is activated during a first comparison period from time t2 to time t5. The first control signal CS1 is transitioned from a logic high level to a logic low level at a time point at which the ramp signal VRAMP is intersected with the analog pixel signal VPIX (e.g., at time t3). The second control signal CS2 is transitioned from the logic high level to the logic low level at a time point at which a predetermined time is elapsed from time t3 (e.g., at time t4). Each of the plurality of digital CDS circuits 551, 552, . . . , 553 stores the digital reset component data corresponding to the reset level RL (e.g., corresponding to a length of a reset counting period RP) by latching the count signal CNT in response to the first and second control signals CS1 and CS2.

At time t5, the ramp enable signal REN is deactivated, and thus the ramp signal VRAMP is deactivated during a period from time t5 to time t7. At time t6, the transfer signal TX is activated, the transfer transistor 620 is turned on in response to the transfer signal TX, and the photo-charges collected within the photoelectric conversion unit 610 are transferred to the floating diffusion node 630 through the transfer transistor 620. After time t6, the transfer signal TX is deactivated when the charge transferring operation is finished, and then the analog pixel signal VPIX has an image level SL corresponding to the incident light. The first and second control signals CS1 and CS2 are transitioned from the logic low level to the logic high level at time t6.

At time t7, the ramp enable signal REN is activated, and thus the ramp signal VRAMP is activated during a second comparison period from time t7 to time t9. The first control signal CS1 is transitioned from the logic high level to the logic low level at a time point at which the ramp signal VRAMP is intersected with the analog pixel signal VPIX (e.g., at time t8). Each of the plurality of digital CDS circuits 551, 552, . . . , 553 stores the digital image component data corresponding to the image level SL (e.g., corresponding to a length of an image counting period SP) by latching the count signal CNT based on the first control signal CS1.

An operation of storing the digital image component data in the first latch unit, an operation of storing the digital reset component data in the second latch unit and an operation of generating the digital effective image data IMGB after time t9 may be substantially the same as the examples described above with reference to FIGS. 1 through 8.

Figure 12:
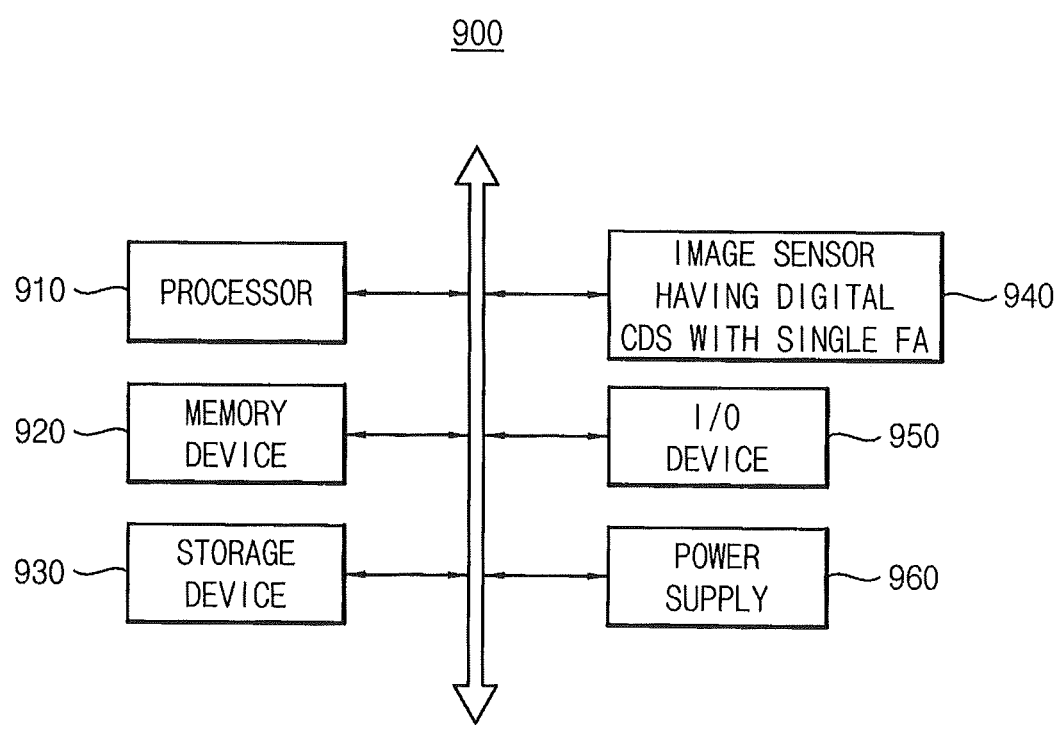
FIG. 12 is a block diagram illustrating a computing system including the image sensor according to example embodiments.

FIG. 12 is a block diagram illustrating a computing system including the image sensor according to example embodiments.

Referring to FIG. 12, a computing system 900 may include a processor 910, a memory device 920, a storage device 930, an image sensor 940, an input/output (I/O) device 950 and a power supply 960. Although not illustrated in FIG. 12, the computing system 900 may further include ports that communicate with a video card, a sound card, a memory card, a universal serial bus (USB) device, or other electronic devices.

The processor 910 may perform various calculations or tasks. According to example embodiments, the processor 910 may be a microprocessor or a central processing unit (CPU). The processor 910 may communicate with the memory device 920, the storage device 930 and the I/O device 950 via an address bus, a control bus, and/or a data bus. In some example embodiments, the processor 910 may be coupled to an extended bus, such as a peripheral component interconnection (PCI) bus.

The memory device 920 may store data for operating the computing system 900. For example, the memory device 920 may be implemented with at least one volatile memory device, e.g., a dynamic random access memory (DRAM) device, a static random access memory (SRAM) device, etc., and/or at least one nonvolatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.

The storage device 930 may include a solid state drive (SSD), a hard disk drive (HDD), a CD-ROM, etc. The I/O device 950 may include an input device (e.g., a keyboard, a keypad, a mouse, etc.) and an output device (e.g., a printer, a display device, etc.). The power supply 960 may supply operation voltages for the computing system 900.

The image sensor 940 may communicate with the processor 910 via the bus or other communication links. The image sensor 940 may be the image sensor 500 of FIG. 9 and may include a plurality of digital CDS circuits. Each digital CDS circuit may be the digital CDS circuit 100 of FIG. 1 and may be implemented with the examples described above with reference to FIGS. 2, 5, 6 and 8. In other words, each digital CDS circuit includes a first latch unit storing digital image component data, a second latch unit storing digital reset component data and a calculating unit generating digital effective image data based on the digital image component data and the digital reset component data and outputting the digital effective image data bit by bit through one signal line. Each digital CDS circuit may include two latch units and one calculating unit having a single 1-bit full adder, and thus each digital CDS circuit and the image sensor 500 including the digital CDS circuits may have relatively simple structures and relatively small sizes.

The image sensor 940 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

In some example embodiments, the image sensor 940 and the processor 910 may be fabricated as one integrated circuit chip. In other example embodiments, the image sensor 940 and the processor 910 may be fabricated as two separate integrated circuit chips.

The computing system 900 may be any computing system using an image sensor. For example, the computing system 900 may include a digital camera, a mobile phone, a smart phone, a portable multimedia player (PMP), a personal digital assistant (PDA), a personal computer, a server computer, a workstation, a laptop computer, a tablet computer, a digital television, a set-top box, a music player, a portable game console, a navigation system, etc.

Figure 13:
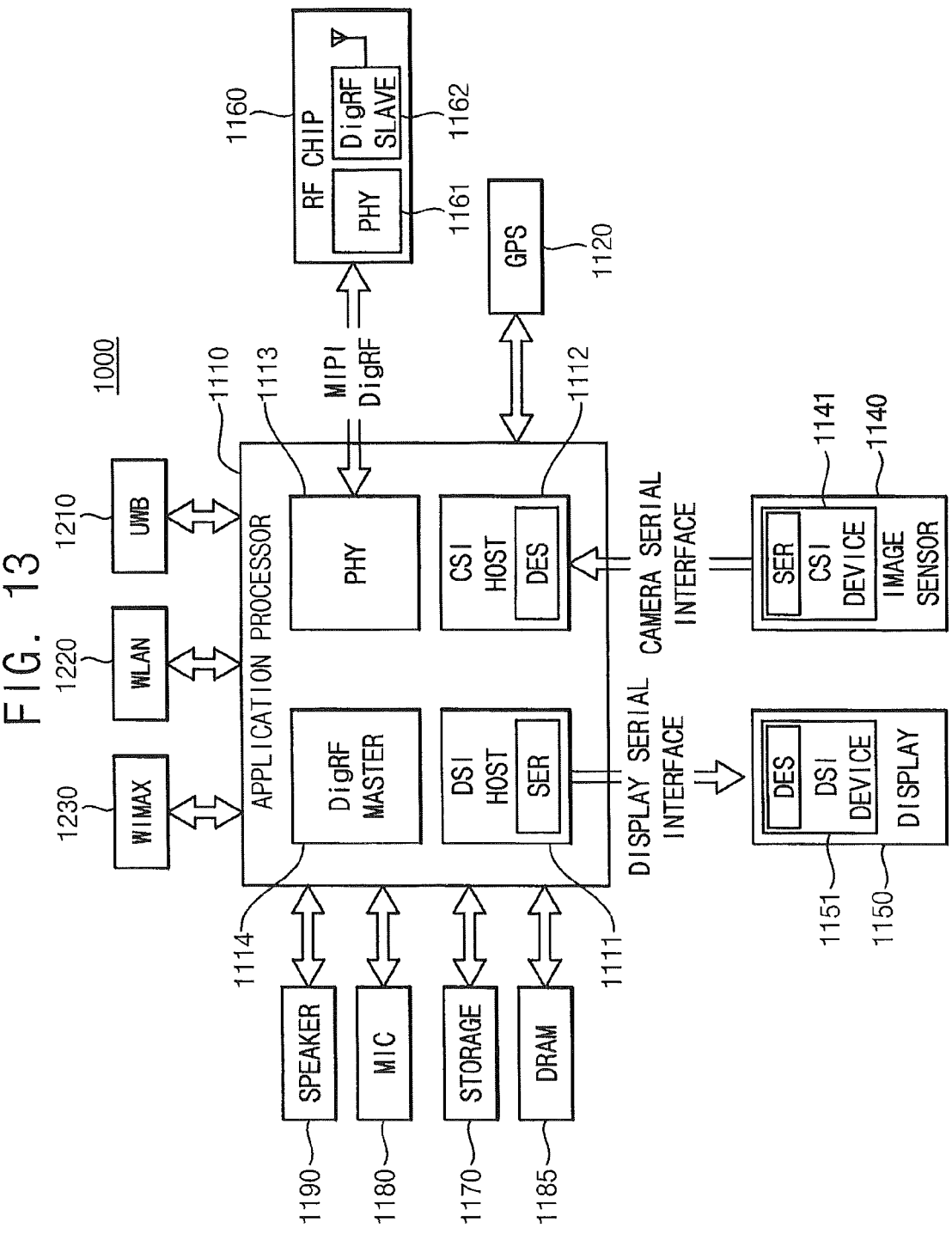
FIG. 13 is a block diagram illustrating an example of an interface employable in the computing system of FIG. 12.

FIG. 13 is a block diagram illustrating an example of an interface employable in the computing system of FIG. 12.

Referring to FIG. 13, a computing system 1000 may be implemented by a data processing device that uses or supports a mobile industry processor interface (MIPI) interface. The computing system 1000 may include an application processor 1110, an image sensor 1140, a display device 1150, etc.

A camera serial interface (CSI) host 1112 of the application processor 1110 may perform a serial communication with a CSI device 1141 of the image sensor 1140 via a CSI. In some example embodiments, the CSI host 1112 may include a deserializer (DES), and the CSI device 1141 may include, a serializer (SER). A display serial interface (DSI) host 1111 of the application processor 1110 may perform a serial communication with a DSI device 1151 of the display device 1150 via a DSI. In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1161. The RF chip 1160 may further include a DigRF SLAVE 1162 that is controlled through the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

The above described embodiments may be applied to an image sensor including a digital CDS circuit and an electronic system including the image sensor. For example, the electronic system may be a system using the image sensor, e.g., a computer, a digital camera, a 3D camera, a cellular phone, a PDA, a scanner, a navigation system, a video phone, a surveillance system, an auto-focusing system, a tracking system, a motion-sensing system and/or an image-stabilization system.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A digital correlated double sampling (CDS) circuit comprising:
 a first latch unit configured to receive digital reset component data and digital image component data and to store the digital image component data by latching a count signal in response to a first control signal;

a second latch unit configured to receive the digital reset component data from the first latch unit and to store the digital reset component data in response to a second control signal; and a calculating unit configured to generate digital effective image data by subtracting the digital reset component data from the digital image component data and configured to sequentially output the digital effective image data.

2. The digital CDS circuit of claim 1, wherein the digital image component data is represented by a first Gray code, and the digital reset component data is represented by a second Gray code, wherein the calculating unit sequentially generates bits of a first binary code corresponding to the first Gray code, sequentially generates bits of a second binary code corresponding to a negative representation of the second Gray code, and generates the digital effective image data by sequentially adding the bits of the first binary code and the bits of the second binary code.

3. The digital CDS circuit of claim 2, wherein the calculating unit generates a first binary bit of the first binary code based on all bits of the first Gray code, generates a second binary bit of the second binary code based on all bits of the second Gray code and generates a first bit of the digital effective image data based on the first binary bit and the second binary bit.

4. The digital CDS circuit of claim 3, wherein the first latch unit outputs the first Gray code in response to a third control signal, and the second latch unit outputs the second Gray code in response to the third control signal, wherein the calculating unit generates the first binary bit by sequentially performing XOR operations based on each of the bits of the first Gray code and generates the second binary bit by sequentially performing the XOR operations based on each of the bits of the second Gray code.

5. The digital CDS circuit of claim 3, wherein the first latch unit simultaneously outputs the all bits of the first Gray code, and the second latch unit simultaneously outputs the all bits of the second Gray code, wherein the calculating unit generates the first binary bit by performing a XOR operation on the all bits of the first Gray code and generates the second binary bit by performing the XOR operation on the all bits of the second Gray code.

6. The digital CDS circuit of claim 3, wherein the first binary bit is a least significant bit (LSB) of the first binary code, the second binary bit is a LSB of the second binary code, and the first bit of the digital effective image data is a LSB of the digital effective image data.

7. The digital CDS circuit of claim 3, wherein the calculating unit generates a third binary bit of the first binary code based on the first binary bit and a first Gray bit of the first Gray code, generates a fourth binary bit of the second binary code based on the second binary bit and a second Gray bit of the second Gray code and generates a second bit of the digital effective image data based on the third binary bit and the fourth binary bit.

8. The digital CDS circuit of claim 1, wherein the first latch unit includes:

a plurality of image latches, each image latch configured to store a respective one bit of the digital reset component data by latching a respective one bit of the count signal in response to the first control signal and configured to store a respective one bit of the digital image component data by latching the respective one bit of the count signal in response to the first control signal; and a plurality of image output switches, each image output switch configured to selectively connect an output terminal of a respective one image latch with a first signal line in response to a third control signal.

9. The digital CDS circuit of claim 8, wherein the second latch unit includes:

a plurality of reset latches, each reset latch connected to the output terminal of the respective one image latch and configured to store the respective one bit of the digital reset component data by latching an output of the respective one image latch in response to the second control signal; and a plurality of reset output switches, each reset output switch configured to selectively connect an output terminal of a respective one reset latch with a second signal line in response to the third control signal.

10. The digital CDS circuit of claim 1, wherein the digital image component data is a first Gray code, and the digital reset component data is a second Gray code, wherein the calculating unit includes:

a first Gray-to-binary converter configured to generate a first binary code by performing a Gray-to-binary conversion on the digital image component data bit by bit;

a second Gray-to-binary converter configured to generate a second binary code by performing the Gray-to-binary conversion and a complement conversion on the digital reset component data bit by bit; and a 1-bit full adder configured to generate the digital effective image data by adding the first binary code and the second binary code bit by bit.

11. The digital CDS circuit of claim 10, wherein the first Gray-to-binary converter includes:

a first XOR gate; and a first flip-flop configured to store an output of the first XOR gate, wherein the first XOR gate generates one bit of the first binary code by performing an XOR operation on one bit of the digital image component data and an output of the first flip-flop.

12. The digital CDS circuit of claim 11, wherein the second Gray-to-binary converter includes:

a second XOR gate; and a second flip-flop configured to store an output of the second XOR gate, wherein the second XOR gate generates one bit of the second binary code by performing the XOR operation on one bit of the digital reset component data and an output of the second flip-flop, and a first initial value stored in the first flip-flop is different from a second initial value stored in the second flip-flop.

13. The digital CDS circuit of claim 10, wherein the first Gray-to-binary converter includes:

a first XOR gate;

a first binary bit generator configured to generate a first binary bit of the first binary code by performing a XOR operation on all bits of the digital image component data;

a first multiplexer configured to select one of an output of the first XOR gate and an output of the first binary bit generator in response to a selection signal; and a first flip-flop configured to store an output of the first multiplexer, wherein the first XOR gate generates one bit of the first binary code except the first binary bit by performing the XOR operation on one bit of the digital image component data and an output of the first flip-flop.

14. The digital CDS circuit of claim 13, wherein the second Gray-to-binary converter includes:
 a second XOR gate;
 a second binary bit generator configured to generate a second binary bit of the second binary code by performing the XOR operation on all bits of the digital reset component data and by inverting a result of the XOR operation on the all bits of the digital reset component data;
 a second multiplexer configured to select one of an output of the second XOR gate and an output of the second binary bit generator in response to the selection signal; and
 a second flip-flop configured to store an output of the second multiplexer,
 wherein the second XOR gate generates one bit of the second binary code except the second binary bit by performing the XOR operation on one bit of the digital reset component data and an output of the second flip-flop.

15. The digital CDS circuit of claim 1, wherein the first latch unit is configured to store the digital reset component data, and wherein the second latch unit is configured to store the digital reset component data by latching an output of the first latch unit.

16. The digital CDS circuit of claim 1, wherein the calculating unit is configured to subtract the digital reset component data from the digital image component data on a bit by bit basis and to sequentially output the digital effective image data on a bit by bit basis.

17. An image sensor comprising:
 a pixel array configured to generate a plurality of analog pixel signals in response to incident light;
 a comparison block configured to generate a plurality of first control signals and a plurality of second control signals by comparing the plurality of analog pixel signals with a ramp signal;
 a counter configured to generate a count signal in response to a clock signal; and
 a digital correlated double sampling (CDS) block configured to generate a plurality of digital effective image data corresponding to the plurality of analog pixel signals by performing a digital CDS in response to the plurality of first and second control signals and the count signal,
 wherein the comparison block includes a plurality of comparators, each comparator receives a respective one of the plurality of analog pixel signals, the digital CDS block includes a plurality of digital CDS circuits, and each digital CDS circuit is connected to a respective one of the plurality of comparators,
 wherein each digital CDS circuit includes:
  a first latch unit configured to receive digital reset component data and digital image component data and to store the digital reset component data and digital image component data by latching the count signal in response to a respective one of the plurality of first control signals;
  a second latch unit configured to receive the digital reset component data from the first latch unit and to store the digital reset component data by latching an output of the first latch unit in response to a respective one of the plurality of second control signals; and
  a calculating unit configured to generate a respective one of the plurality of digital effective image data by subtracting the digital reset component data from the digital image component data bit by bit and configured to sequentially output the respective one of the plurality of digital effective image data bit by bit.

18. A digital correlated double sampling (CDS) circuit, comprising:
 a first latch unit configured to receive a first count signal and a second count signal and to generate image data by latching the first count signal;
 a second latch unit configured to receive the second count signal from the first latch unit and to generate reset data by latching the second count signal; and
 a calculating unit configured to generate corrected image data by subtracting the reset data from the image data;
 wherein the calculating unit comprises a one bit full adder that is configured to receive the image data and the reset data as serial data and to subtract the reset data from the image data one bit at a time.

19. The digital CDS circuit of claim 18, wherein the second count signal is provided as an output of the first latch unit.

20. The digital CDS circuit of claim 18, wherein the first latch unit comprises a plurality of image latches, each image latch configured to store a respective one bit of the reset data by latching a respective one bit of the count signal in response to the first control signal and configured to store a respective one bit of the image data by latching the respective one bit of the count signal in response to the first control signal; and
 wherein the second latch unit comprises a plurality of reset latches, each reset latch connected to the output terminal of the respective one image latch and configured to store the respective one bit of the reset data by latching an output of the respective one image latch in response to the second control signal.

* * * * *